US011553546B2

(12) United States Patent
Karandikar et al.

(10) Patent No.: US 11,553,546 B2
(45) Date of Patent: Jan. 10, 2023

(54) METHODS AND SYSTEMS FOR RADIO ACCESS NETWORK AGGREGATION AND UNIFORM CONTROL OF MULTI-RAT NETWORKS

(71) Applicant: Indian Institute of Technology Bombay, Maharashtra (IN)

(72) Inventors: Abhay Karandikar, Maharashtra (IN); Prasanna Chaporkar, Maharashtra (IN); Pranav Kumar Jha, Haryana (IN); Akshatha Nayak M., Bangalore (IN)

(73) Assignee: INDIAN INSTITUTE OF TECHNOLOGY BOMBAY, Maharashtra (IN)

( * ) Notice: Subject to any disclaimer, the term of this patent is extended or adjusted under 35 U.S.C. 154(b) by 266 days.

(21) Appl. No.: 16/842,095

(22) Filed: Apr. 7, 2020

(65) Prior Publication Data
US 2021/0112616 A1 Apr. 15, 2021

(30) Foreign Application Priority Data
Oct. 15, 2019 (IN) .............................. 201921041762

(51) Int. Cl.
| | |
|---|---|
| *H04W 76/16* | (2018.01) |
| *H04W 80/02* | (2009.01) |
| *H04W 24/10* | (2009.01) |
| *H04W 76/27* | (2018.01) |
| *H04W 74/08* | (2009.01) |
| *H04W 92/20* | (2009.01) |
| *H04W 84/12* | (2009.01) |

(52) U.S. Cl.
CPC .......... *H04W 76/16* (2018.02); *H04W 24/10* (2013.01); *H04W 74/0833* (2013.01); *H04W 76/27* (2018.02); *H04W 80/02* (2013.01); *H04W 84/12* (2013.01); *H04W 92/20* (2013.01)

(58) Field of Classification Search
CPC . H04W 76/16; H04W 24/10; H04W 74/0833; H04W 76/27; H04W 80/02; H04W 84/12; H04W 92/20; H04W 36/0069
See application file for complete search history.

(56) References Cited

U.S. PATENT DOCUMENTS 10,631,358 B1 * 4/2020 Fang ...................... H04L 27/265
2019/0261457 A1 * 8/2019 Jiang ...................... H04W 88/06
(Continued)

*Primary Examiner* — Will W Lin
(74) *Attorney, Agent, or Firm* — Hauptman Ham, LLP

(57) ABSTRACT

Methods and systems for Radio Access Network (RAN) aggregation of multiple Radio Access Technologies (RATs). A method disclosed herein includes aggregating the RATs at a RAN level to provide at least one User Equipment (UE) with multi-connectivity. The method further includes enabling at least one Centralized unit (gNodeB-CU) within at least one RAN node to uniformly control Distributed Units (DUs) of different RATs (5G New Radio (NR) and Wireless Local Area Network (WLAN) RATs). The method further includes enabling the at least one gNB-CU to control the at least one UE and allow the at least one UE to connect with an additional RAT irrespective of an initial RAT, the UE is connected to. The method further includes controlling WLAN Access Point (AP) as a 5G distributed unit (gNB-DU).

34 Claims, 16 Drawing Sheets

(56) References Cited

U.S. PATENT DOCUMENTS

| | | | |
|---|---|---|---|
| 2019/0306283 A1* | 10/2019 | Fang | H04W 28/08 |
| 2020/0128601 A1* | 4/2020 | Willars | H04W 76/15 |
| 2021/0045000 A1* | 2/2021 | Dalsgaard | H04W 76/10 |
| 2021/0112551 A1* | 4/2021 | Anderson | H04W 72/0453 |
| 2021/0360466 A1* | 11/2021 | Jactat | H04W 28/0263 |
| 2021/0377787 A1* | 12/2021 | Zhuo | H04W 72/14 |
| 2021/0377846 A1* | 12/2021 | Zhu | H04L 5/0053 |

* cited by examiner

Control plane stack for the UE

Data plane stack for the UE

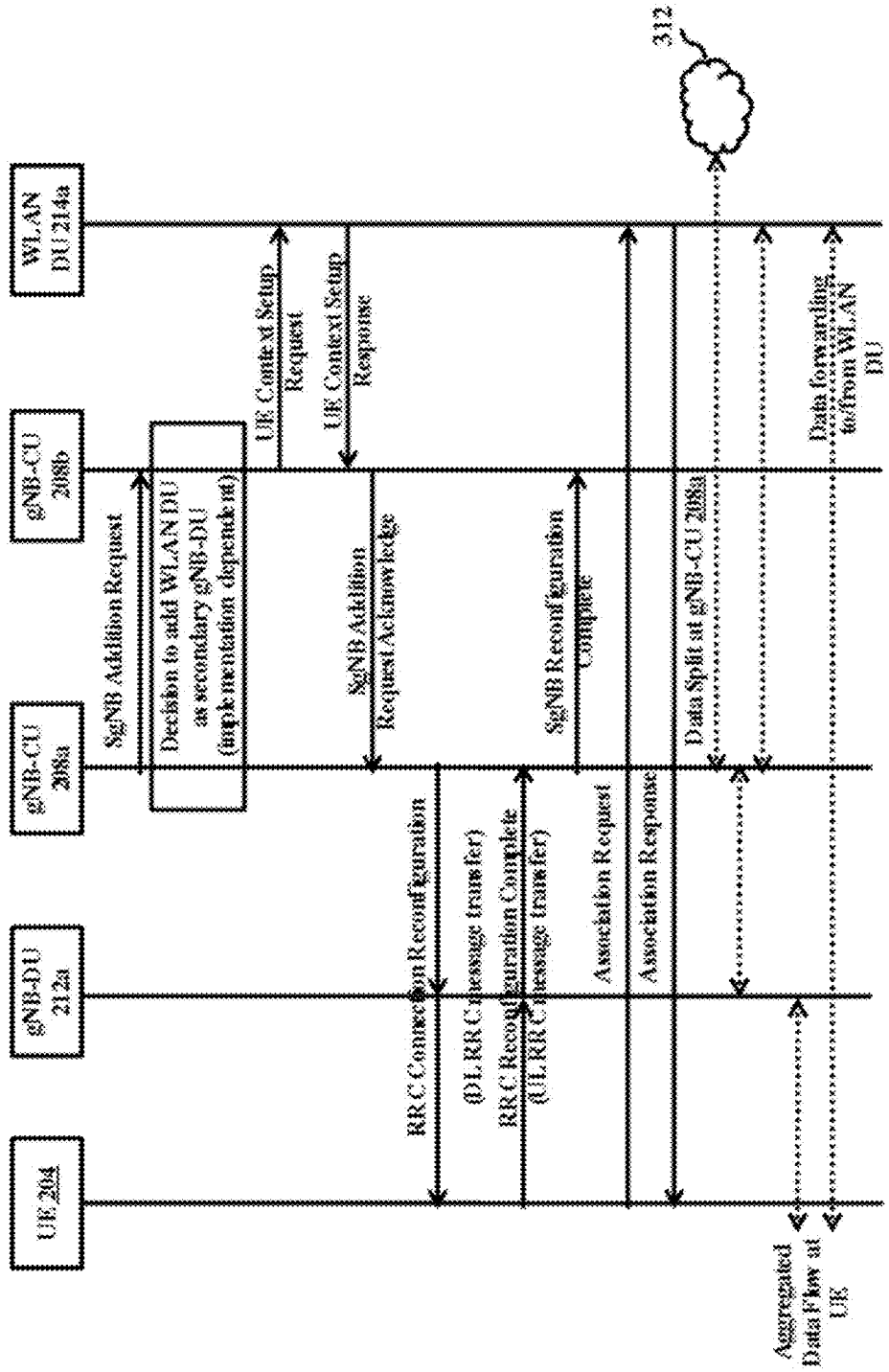

METHODS AND SYSTEMS FOR RADIO ACCESS NETWORK AGGREGATION AND UNIFORM CONTROL OF MULTI-RAT NETWORKS

CROSS REFERENCE TO RELATED APPLICATION

This application claims the priority of Indian Patent Application No. 201921041762 filed on Oct. 15, 2019, the disclosure of which is hereby incorporated by reference in its entirety.

TECHNICAL FIELD

Embodiments disclosed herein relate to wireless communication networks, and more particularly to Radio Access Network (RAN) aggregation of multiple Radio Access Technologies (RATs) and enabling uniform control and management of radio resources of the multiple RATs at a RAN level for providing a User Equipment (UE) with multi-connectivity.

BACKGROUND

A 3rd Generation Partnership Project (3GPP) Fifth Generation (5G) network supports multiple Radio Access Technologies (RATs) such as, 3GPP New Radio (NR), non-3GPP Wireless Local Area Network (WLAN), or the like. Such RATs may be connected to a common core network such as a 5G Core (5GC) network. However, the conventional 3GPP 5G network does not involve any mechanism for enabling unified control of the WLAN and the 5G NR in a Radio Access Network (RAN). Also, the conventional 3GPP 5G network does not involve any inter-working mechanisms across heterogeneous RATs for supporting certain functionalities such as aggregating multiple RATs at a RAN level, providing a User Equipment (UE) with multi-connectivity between the WLAN and the 5G RAT, and so on.

FIGS. 1a and 1b depict the conventional 3GPP 5G network. The 3GPP 5G network (as defined in "3GPP TS 23.501 v 16.2.0, System architecture for the 5G System (5GS), 2019") supports both the 5G NR and the WLAN. The 3GPP 5G network includes at least one 5G NR Base Station (gNB), which comprises two or more entities/nodes namely a single gNB Centralized Unit (gNB-CU) and one or more distributed units (gNB-DUs). The gNB-CU can be a logical node that hosts Radio Resource Control (RRC), Service Data Adaptation Protocol (SDAP) and Packet Data Convergence Protocol (PDCP) protocols of the gNB. The gNB-CU controls the one or more gNB-DUs over an F1 interface. The gNB-CU is further connected to an Access and Mobility Function (AMF) of the 5GC using an N2 interface for control. The gNB-CU may also be connected to a User Plane Function (UPF) within the 5GC for enabling data transfer using an N3 interface. The gNB-DU can be a logical node hosting Radio Link Control (RLC), Medium Access Control (MAC) and Physical Layer (PHY) layers of the gNB. Control plane protocol stacks of the gNB-CU and the gNB-DU are illustrated in FIG. 1a. A control-signaling path and a data flow for the 5G NR RAT as defined by the 3GPP are illustrated in FIG. 1b.

As the 3GPP 5G network supports the WLAN, Access Points (APs) within the WLAN can be connected to the 5GC through an interworking function such as a Non-3GPP Inter Working Function (N3IWF) as illustrated in FIG. 1a. The N3IWF can connect to the one or more APs over an Y2 interface. The N3IWF can be connected to the 5GC using the N2 interface for control and the N3 interface for the data transfer respectively.

However, the conventional 3GPP 5G network does not support any mechanisms for connecting the WLAN AP as the gNB-DU to the gNB-CU (hereinafter referred to as WLAN DU) to achieve uniform control and management within the RAN. Further, the conventional 3GPP 5G network does not provide mechanism for the UE to achieve multi-connectivity with the 5G NR and the WLAN.

OBJECTS

The principal object of embodiments herein is to disclose methods and systems for aggregation of multiple-Radio Access Technologies (RATs) at a Radio Access Network (RAN) level to provide at least one User Equipment (UE) with multi-connectivity.

Another object of embodiments herein is to disclose methods and systems for enabling at least one Centralized Unit (gNodeB-CU) within at least one RAN node to control a plurality of Distributed Units (DUs) of different RATs (5G New Radio (NR) and Wireless Local Area Network (WLAN) RATs).

Another object of embodiments herein is to disclose methods and systems for enabling the at least one gNB-CU to control the at least one UE and allow the at least one UE to connect to an additional RAT irrespective of an initial RAT, the UE is connected to.

Another object of embodiments herein is to disclose methods and systems for managing a handover of the at least one UE from one RAT to another without requiring a signaling through a core network.

Another object of embodiments herein is to disclose methods and systems for enabling the at least one UE that may not be 5G NR capable to connect to the core network.

Another object of embodiments herein is to disclose methods and systems for providing a RAT agnostic and unified interface towards a 5G core network (5GC) through the at least one gNB-CU.

Another object of embodiments herein is to disclose methods and systems for reducing signaling in case of a network slicing by eliminating a need for different UE registration areas across the RATs, when the at least one gNB-DU and at least one Access Point (AP) of the WLAN are co-located.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which:

FIG. 8a is a sequence diagram illustrating a call flow for providing the UE with the multi-connectivity when the UE is initially connected to the gNB-DU and when the WLAN DU and the gNB-DU are connected to the different gNB-CUs, according to embodiments as disclosed herein.

DETAILED DESCRIPTION

Figure 1A:
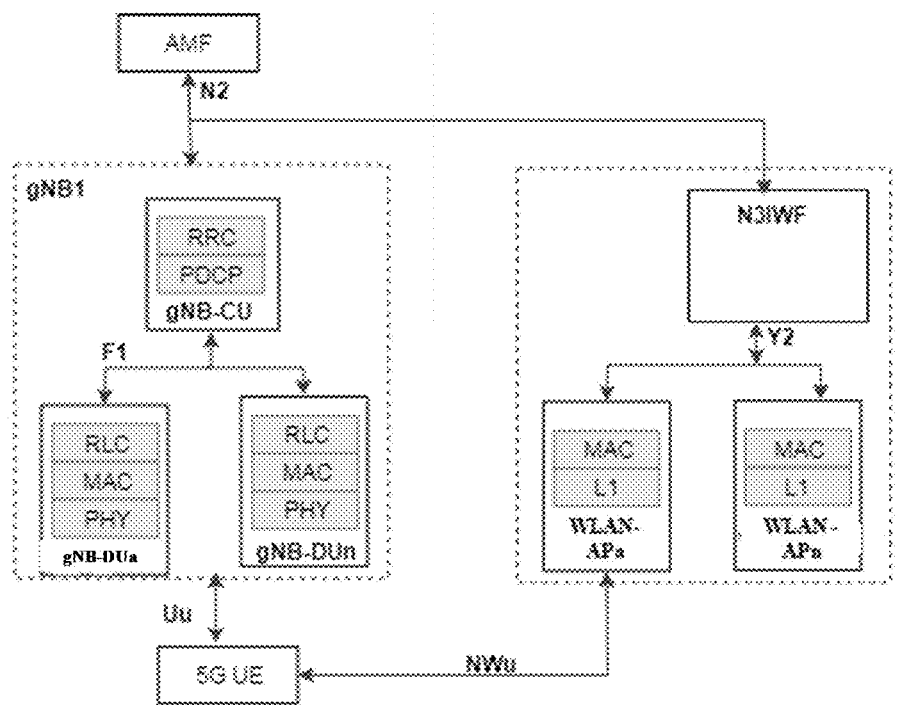
FIGS. 1a and 1b depict a conventional 3rd Generation Partnership Project (3GPP) Fifth Generation (5G) network.
Figure 1B:
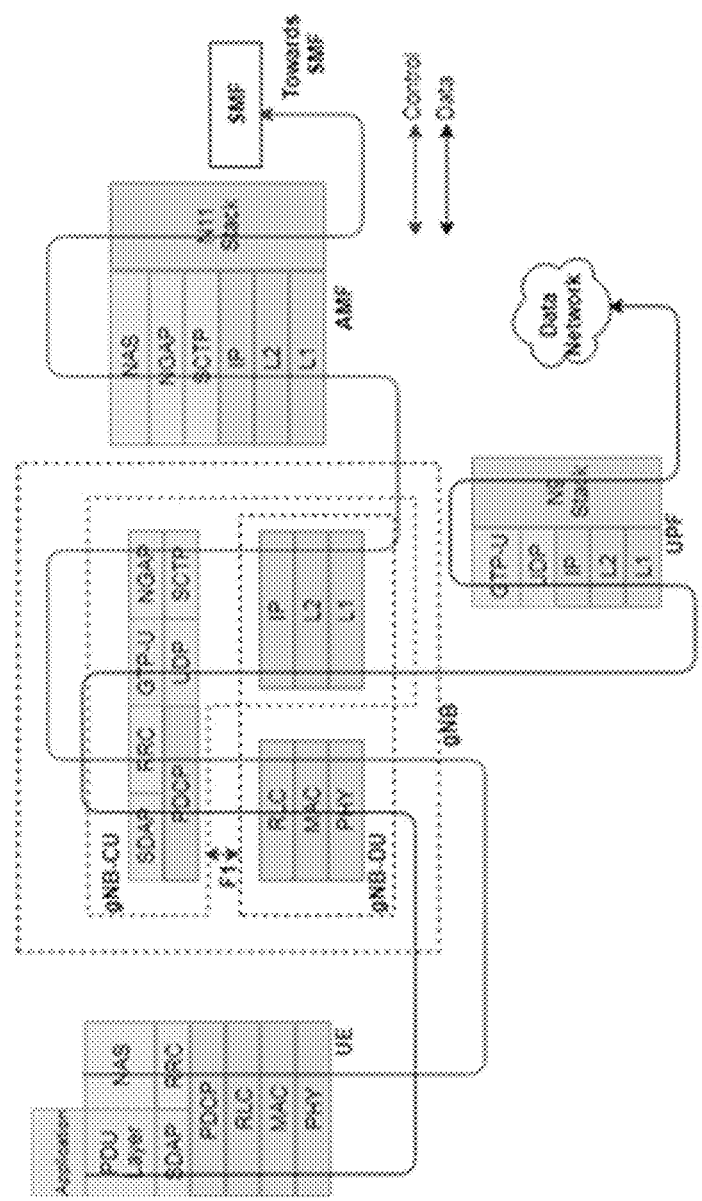

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for aggregation of multiple-Radio Access Technologies (RATs) at a Radio Access Network (RAN) for data offloading and handover within the RAN.

Embodiments herein disclose methods and systems for aggregation of a 3rd Generation Partnership Project (3GPP) Fifth Generation (5G) New Radio (NR) and a Wireless Local Area Network (WLAN) at the RAN level for providing at least one User Equipment (UE) with multi-connectivity between the 5G NR and the WLAN.

Referring now to the drawings, and more particularly to FIGS. 2a through 8b, where similar reference characters denote corresponding features consistently throughout the figures, there are shown embodiments.

Figure 2A:
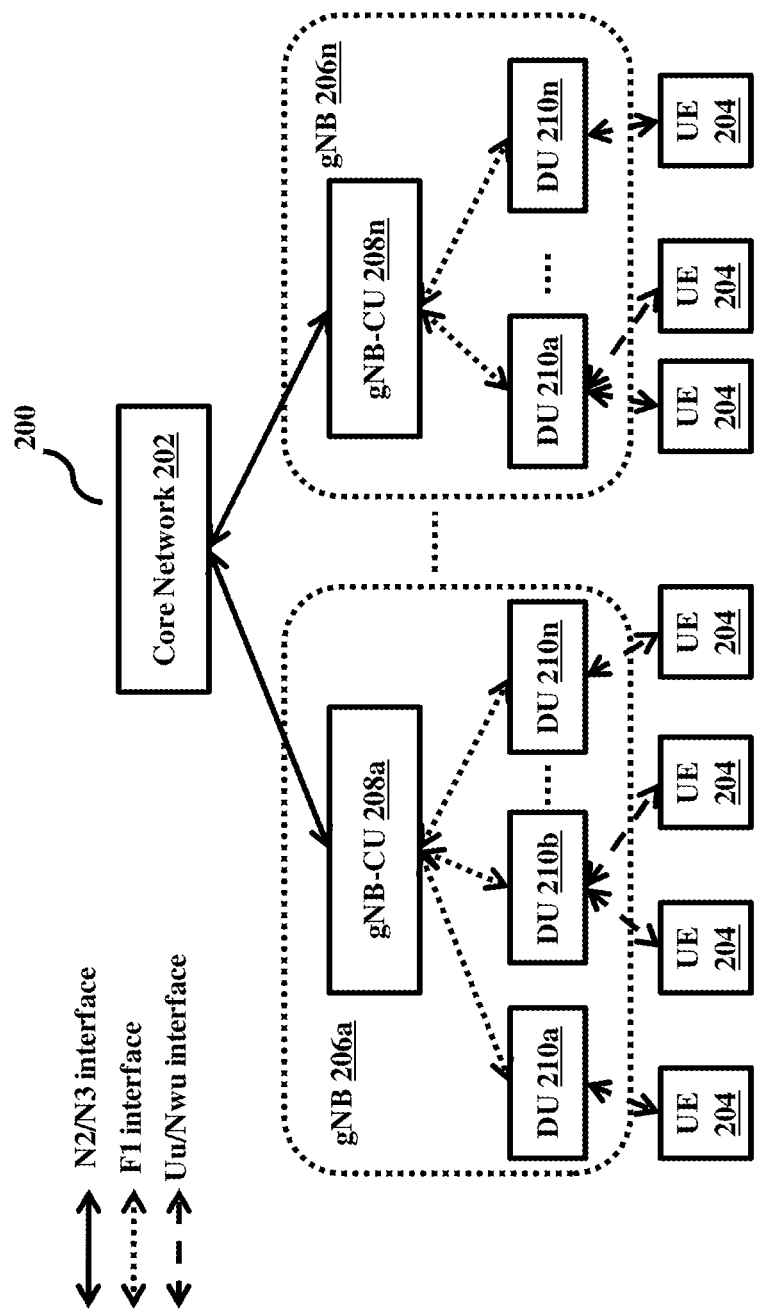
FIGS. 2a-2c depict a wireless communication network, according to embodiments as disclosed herein.
Figure 2B:
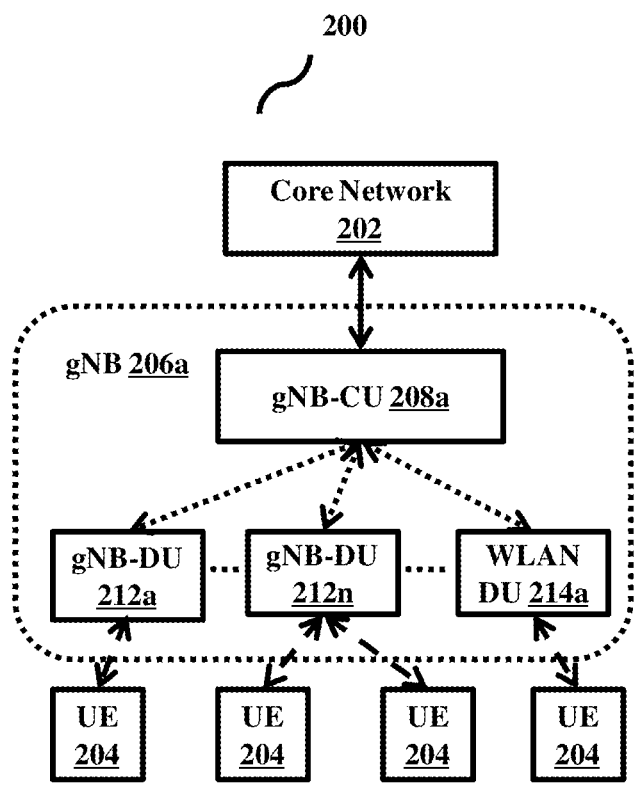
Figure 2C:
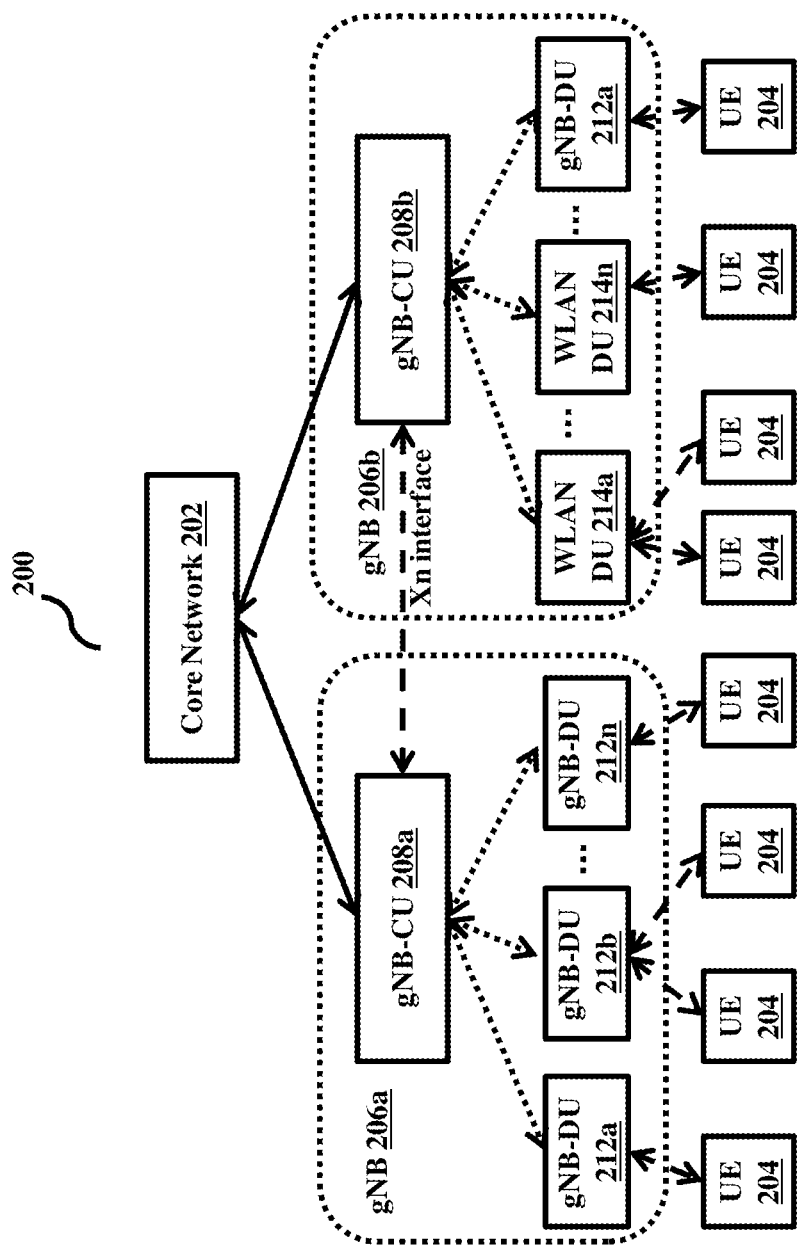

FIGS. 2a-2c depict a wireless communication network 200, according to embodiments as disclosed herein. The wireless communication network 200 referred herein can be a Fifth Generation (5G) New Radio (NR) network supporting multiple-Radio Access Technologies (RATs) such as a 3rd Generation Partnership Project (3GPP) 5G NR, a non-3GPP Wireless Local Area Network (WLAN)/Wireless Fidelity (Wi-Fi), and so on.

In an embodiment, the wireless communication network 200 supports a Radio Access Network (RAN) level aggregation for providing a User Equipment (UE) with multi-connectivity. The RAN level aggregation enables a uniform radio resource management across the multiple RATs or a multi-RAT network at a RAN level. The RAN level aggregation also enables functionalities such as, but not limited to, handover, load balancing, offloading of data traffic within the RAN by considering access network conditions, and so on without a need of signaling exchange with a core network. Thus, the RAN level aggregation reduces signaling in comparison to core network offloading, that results in improved network performance by reducing signaling latency. Further, the multi-connectivity provides one or more data paths over a radio interface to the UE by allowing the UE to connect with at least two RANs/base stations (BSs) at a time, resulting in increased user throughput. In an example herein, the UE may be provided with the multi-connectivity between the 5G NR and the WLAN by enabling the UE to connect to a 5G NR BS and at least one Access Point (AP) of the WLAN. The multi-connectivity provides better per user throughput and reduces handover failures.

As illustrated in FIG. 2a, the wireless communication network 200 includes a core network (CN) 202, User Equipments (UEs) 204, and one or more RAN entities/nodes 206a-206n.

The CN 202 can be a 5G Core (5G) network 202. The 5GC 202 can be connected to the at least one RAN node 206a-206n. The 5GC 202 can be configured to connect the at least one UE 204 (connected with the at least one RAN node) to an external data network 312. Examples of the external data network 312 can be, but not limited to, the Internet, a Packet Data Network (PDN), an Internet Protocol (IP) Multimedia Core Network Subsystem, and so on.

The UE(s) 204 referred herein can be a device with radio frequency (RF) processing capabilities. Examples of the UE 204 can be, but not limited to, a mobile phone, a smartphone, a tablet, a phablet, a personal digital assistant (PDA), a laptop, a computer, a wearable computing device, a vehicle infotainment device, an Internet of Things (IoT) device, a Wireless Fidelity (Wi-Fi) router, a USB dongle, or any other processing devices capable of using the communication network 200. The UE 204 can include one or more processors/Central Processing Units (CPUs), a memory, a transceiver, and so on, for performing at least one intended function/operation. In an embodiment, the UE 204 can be a 5G compliant UE. In an embodiment, the UE 204 can be a non 5G compliant UE. In case of the non 5G compliant UE, the UE 204 may include a L3 layer to connect to the 5GC 202.

The one or more RAN nodes 206a-206n can be configured to connect the at least one UE 204 with its associated 5GC 202. The one or more RAN nodes 206a-206n can be 5G gNodeBs (gNBs). In an embodiment, the one or more gNBs 206a-206n may comprise of one or more Centralized Units (gNB-CUs) 208a-208n facing the 5GC 202. The gNB-CUs 208a-208n can be connected with each other. For example, a gNB-CU 208a of a gNB 206a can connect with a gNB-CU 208b of a gNB 206b.

In an embodiment, each gNB-CU (208a-208n) may be connected/integrated with a plurality of Distributed Units (DUs) 210a-210n of different/multiple RATs facing the at least one UE 204. In an embodiment, the plurality of DUs 210a-210n of different RATs include at least one of a plurality of DUs of the 5G NR (hereinafter referred as gNB-DUs 212a-212n) and a plurality of DUs of the WLAN (hereinafter referred as WLAN DUs 214a-214n).

In an embodiment, the plurality of gNB-DUs 212a-212n and the plurality of WLAN DUs 214a-214n can be connected to the single gNB-CU (208a-208n). In an example herein, the plurality of gNB-DUs 212a-212n and a WLAN DU 214a are connected to the gNB-CU 208a as illustrated in FIG. 2b.

In an embodiment, the plurality of gNB-DUs 212a-212n and the plurality of WLAN DUs 214a-214n can be connected to the different gNB-CUs (208a-208n) of the different gNBs 206a-206n. In an example herein, the plurality of gNB-DUs 212a-212n are connected to the gNB-CU 208a, and the plurality of WLAN DUs 214a-214n and a gNB-DU 212a are connected to the gNB-CU 208b of the gNB 206b as illustrated in FIG. 2c.

As illustrated in FIGS. 2a-2c, the gNB-DUs 212a-212n and the WLAN DUs 214a-214n include only data plane functionality. The gNB-DUs 212a-212n and the WLAN DUs 214a-214n can include one or more processors/Central Processing Units (CPUs), a memory, a transceiver, and so on for performing at least one intended function/operation.

In an embodiment, the WLAN DUs 214a-214n can be integrated with the one or more gNB-CU 208a-208n as the gNB-DUs, so that the one or more gNB-CUs 208a-208n can control the gNB-DUs 212a-212n and the WLAN DUs 214a-214n in a uniform manner.

In an embodiment, the DUs 210a-210n (gNB-DUs 212a-212n and the WLAN DUs 214a-214n) can connect to the one or more gNB-CU 208a-208n over an F1 interface. The gNB-DUs 212a-212n can connect to the at least one UE 204 over an air interface (Uu interface) and the WLAN DUs 214a-214n can connect to the at least one UE 204 over an NWu interface.

The DUs 210a-210n can be configured to receive a control plane traffic (data over the control plane/signaling messages/control information) and a data plane traffic/user plane traffic (data over the user/data plane/data packets) from the at least one UE 204. The DUs 210a-210n can be configured to forward the received control plane traffic and data plane traffic to the connected at least one gNB-CU 208a-208n. The DUs 210a-210n can also be configured to receive and forward the control plane and data plane traffic from the at least one gNB-CU 208a-208n to the at least one UE 204.

The one or more gNB-CUs 208a-208n can be an entity/node that hosts Radio Resource Control (RRC), Service Data Adaptation Protocol (SDAP) and Packet Data Convergence Protocol (PDCP) protocols of the gNB and can control operations of the one or more DUs 210a-210n The one or more gNB-CUs 208a-208n can include one or more processors/Central Processing Units (CPUs), a memory, and so on for performing at least one intended function/operation.

The one or more gNB-CUs 208a-208n can connect to the DUs 210a-210n over the F1 interface and to the 5GC 202 over an N2/N3 interface. The one or more gNB-CUs 208a-208n can also connect to each other over an Xn interface.

The one or more gNB-CUs 208a-208n can be configured to receive the control plane and data plane traffic of the at least one UE 204 from the at least one DU 210a-210n and forward the received control plane and data plane traffic of the at least one UE 204 to the 5GC 202. The one or more gNB-CUs 208a-208n can be also configured to receive the control plane and data plane traffic from the external data network 312 through the 5GC 202 and forward the received control plane and data plane traffic to the at least one UE 204 through the one or more DUs 210a-210n. The one or more gNB-CUs 208a-208n can be also configured to receive the control plane and data plane traffic from the external data network 312 directly and forward the received control plane and data plane traffic to the at least one UE 204 through the one or more DUs 210a-210n.

In an embodiment, the one or more gNB-CUs 208a-208n can be configured to control the DUs 210a-210n of different RATs (the gNB-DUs 212a-212n and the WLAN DUs 214a-214n) in a uniform manner, thus enabling a centralized control.

In an embodiment, the one or more gNB-CUs 208a-208n can also be configured to control the at least one UE 204 through the at least one DU 210a-210n. The one or more gNB-CUs 208a-208n further enable the at least one UE 204 to connect to one or more DUs 212a-212n of different RATs, irrespective of the initial DU, the at least one UE 204 is connected to, thus enabling UE 204 to multi-connect to different RATs.

In an embodiment, the one or more gNB-CUs 208a-208n can be configured to manage a handover of the at least one UE 204 between the different RATs (the 5G NR and the WLAN) within the RAN without requiring a signaling through the 5GC 202.

FIGS. 3a-3d depict the wireless communication network 200, wherein the DUs 210a-210n of different RATs are aggregated at the RAN level, according to embodiments as disclosed herein. Embodiments herein are further explained considering the aggregation of the gNB-DUs 212a-212n and the WLAN DUs 214a-214n at the RAN level for providing the at least one UE 204 with the multi-connectivity between the 5G NR and WLAN RATs.

Figure 3A:
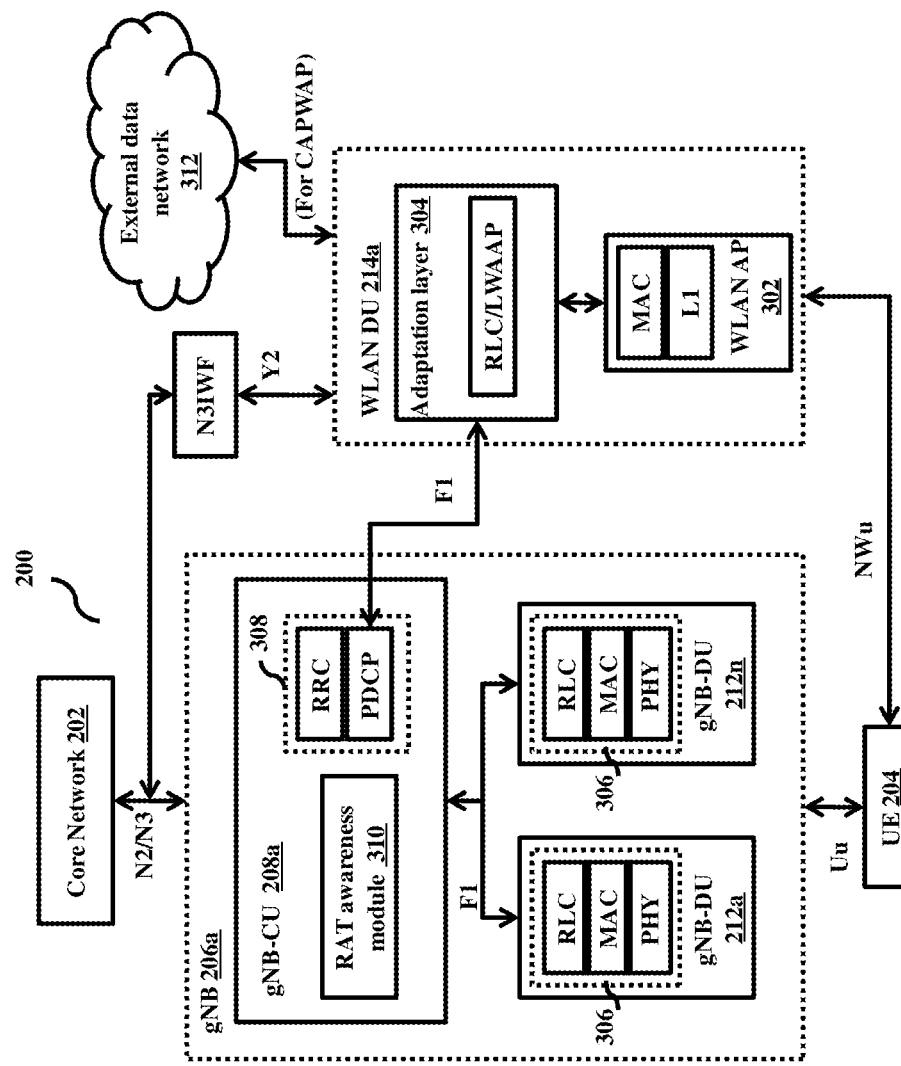
FIGS. 3a-3d depict the wireless communication network, wherein Distributed Units (DUs) of different Radio Access Technologies (RATs) are aggregated at a Radio Access Network (RAN) level, according to embodiments as disclosed herein.
Figure 3B:
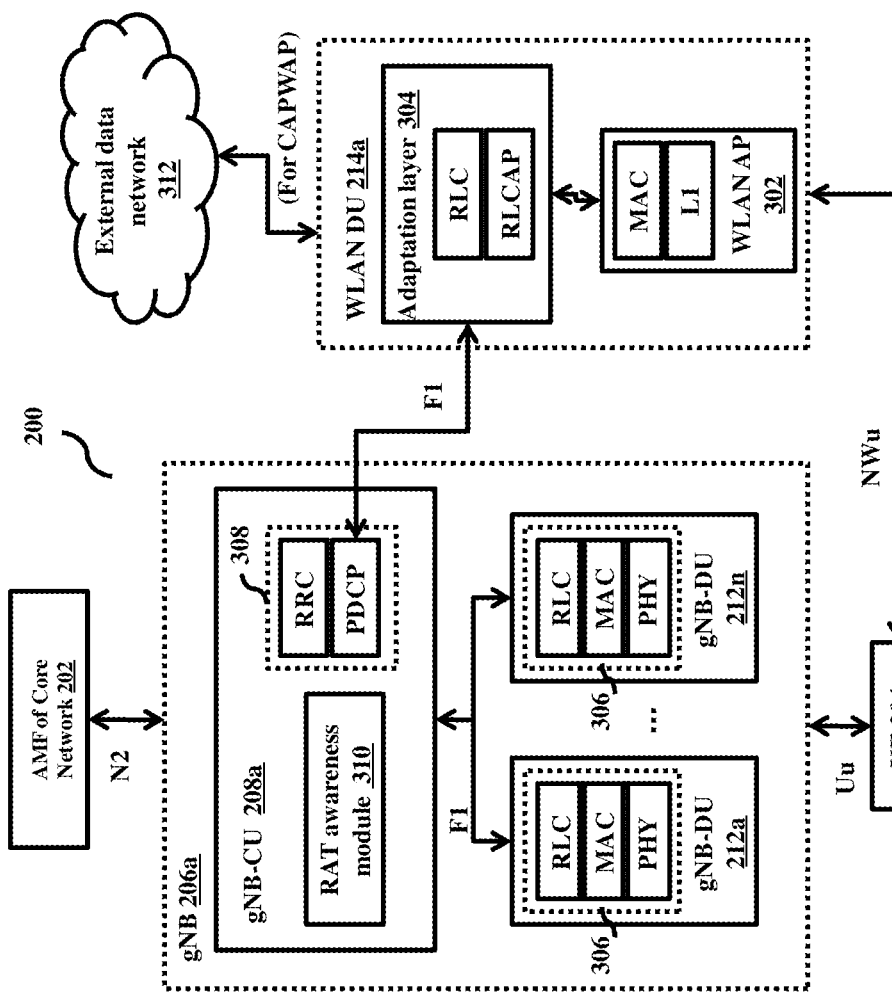
Figure 3C:
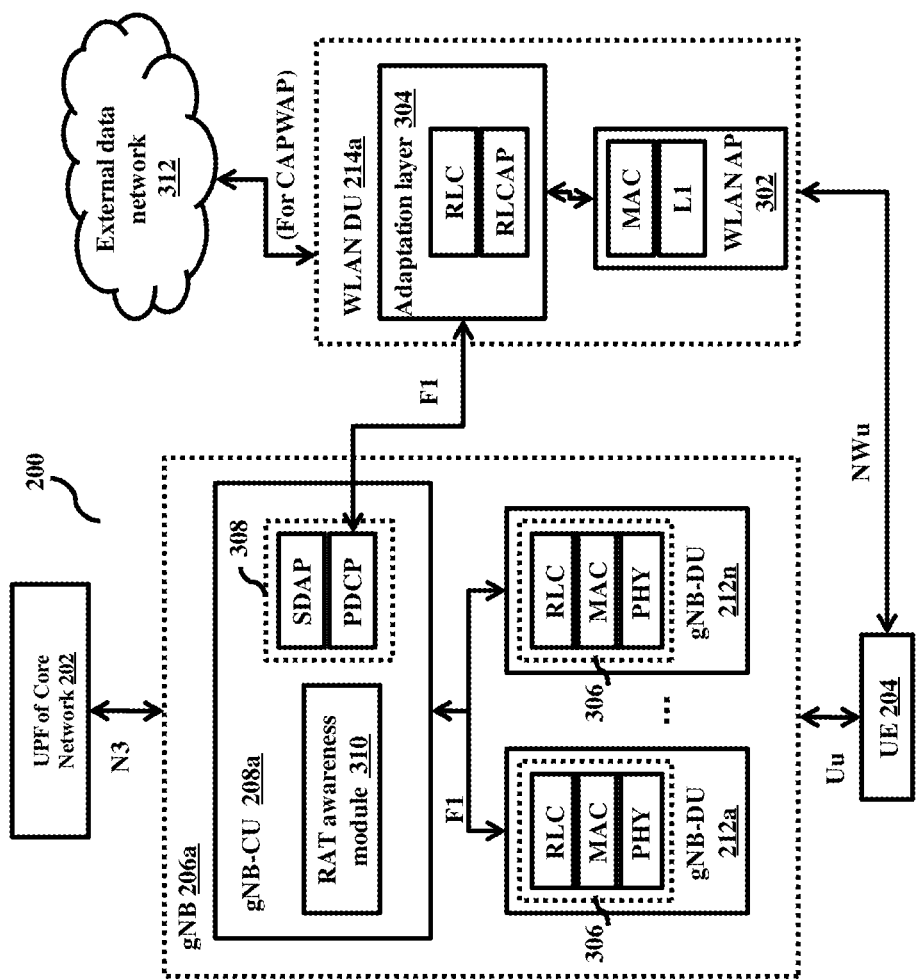

In an embodiment, the gNB-DUs 212a-212n and the WLAN DUs 214a-214n can be aggregated with the single gNB-CU 208a. In an example herein, the gNB-DUs 212a-212n and the WLAN DU 214 are connected to the gNB-CU 208a as illustrated in FIG. 3a-3c. The single gNB-CU 208a controls both the WLAN DU 214a and the gNB-DUs 212a-212n in a unified manner A control plane network 200 and a user plane network 200 depicting the aggregation of the gNB-DUs 212a-212n and the WLAN DU 214a-214n with the single gNB-CU 208a are illustrated in FIGS. 3b and 3c respectively.

Figure 3D:
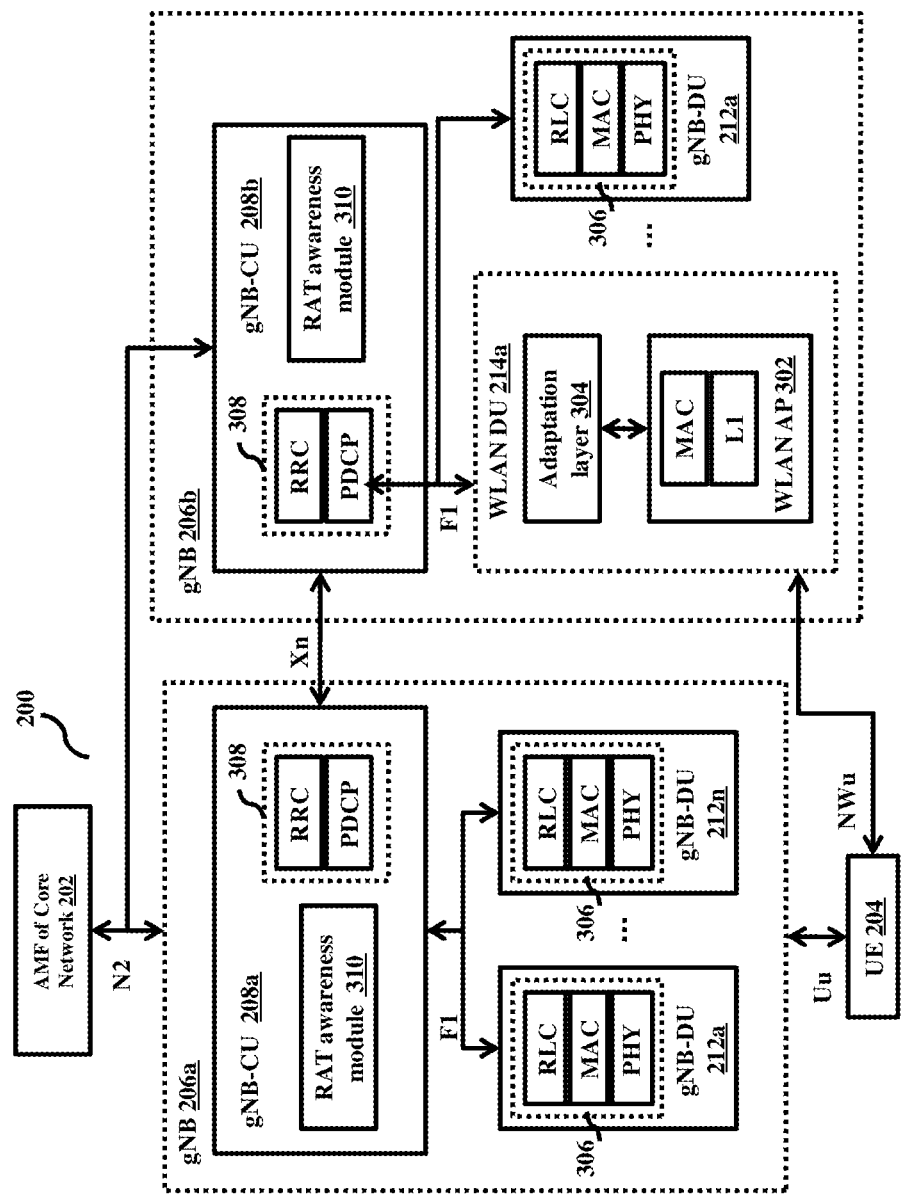

In an embodiment, the gNB-DUs 212a-212n and the WLAN DUs 214a-214n can be aggregated with the one or more gNB-CUs 208a-208n of the different gNBs 206a-206n as illustrated in FIG. 3d. In an example herein, the gNB-DUs 212a-212n can be aggregated with the gNB-CU 208a of the gNB 206a. The WLAN DUs 214a and the gNB-DU 212a can be aggregated with the gNB-CU 208b of the gNB 206b. The gNB-CU 208a controls the gNB-DUs 212a-212n. The gNB-CU 208b controls the WLAN DU 214a and the gNB-DU 212a. The gNB-CU 208a of the gNB 206a can connect with the gNB-CU 208b of the gNB 206b to provide the at least one UE 204 with the multi-connectivity between the 5G NR and the WLAN RATs.

As illustrated in FIGS. 3a-3d, the WLAN DU 214a can be connected to the at least one gNB-CU (208a-208n) as the gNB-DU. The WLAN DU 214a can be connected to the gNB-CU 208a/208b over the F1 interface. The F1 interface can be a standard interface specified by the 3GPP between the at least one gNB-CU (208a-208n) and the at least one gNB-DU 212a-212n.

The WLAN DU 214a can be connected to the 5GC 202 through a Trusted Network Gateway Function (TNGF) and a Non-3GPP Interworking Function (N3IWF) function (if the WLAN DU 214a is not connected with any of the gNB-CUs 208a-208n). In an embodiment, the WLAN DU 214a can be connected to the 5GC 202 through the at least one gNB-CU (208a-208n), thus the TNGF and the N3IWF can be removed from the communication network 200 by routing UE data and Non Access Stratum (NAS) signaling through the gNB-CU (208a-208n). In an embodiment, the WLAN DU 214a may also be connected to the external data network 312 directly using a suitable protocol such as, a control and provisioning of wireless access points (CAPWAP) protocol or the like.

In an embodiment, the WLAN DU 214a includes an Access Point (AP) of the WLAN (hereinafter referred as WLAN AP 302) and an adaptation layer 304. The WLAN AP 302 includes a protocol stack comprising of a Medium Access Control (MAC) layer and a L1 layer that enables the WLAN DU 214a to connect to the at least one UE 204. The adaptation layer 304 includes a Radio Link Control (RLC) layer (RLC/LWAAP) and a RLC Adaptation Protocol (RLCAP) module/layer. The RLC can be a RLC layer of the 5G NR. The RLCAP module/layer can be configured to translate RLC messages/requirements into a format that can be understood by the MAC of the WLAN DU 214a. The adaptation layer 304 performs various functions depending on a method used by the WLAN DU 214a to connect to the external data network 312. In an example herein, if the WLAN DU 214a is connected to the 5GC 202 through the at least one gNB-CU (208a-208n), the adaptation layer 304 enables a flow of signaling and data through the RLC layer and the RLCAP layer. In an example herein, if the WLAN DU 214a is connected directly to the external data network 312, the adaptation layer 304 supports a connection protocol such as the CAPWAP protocol or the like.

The gNB-DUs 212a-212n can be connected to the at least one gNB-CU (208a-208n) over the F1 interface. The gNB-DUs 212a-212n include a protocol stack 306 comprising of a RLC layer, a MAC layer and a Physical (PHY) layer, that enables the gNB-DUs 212a-212n to connect to the at least one gNB-CU (208a-208n) and the at least one UE 204.

The gNB-CU (208a-208n) can be a logical node including a protocol stack 308 comprising of a RRC layer, and a PDCP of the gNB, which enables the gNB-CU (208a-208n) to control operations of the gNB-DUs 212a-212n. In an embodiment, the gNB-CU (208a-208n) also includes a RAT awareness module 310. The RAT awareness module 310 can be configured to provide details related to the WLAN DU 214a to the gNB-CU (208a-208n), so that the gNB-CU (208a-208n) can control the operations of the WLAN DU 214a by considering the WLAN DU 214a as the gNB-DU. The details can be at least one of Quality of Service (QoS) parameters to be supported, cell identity (cell ID), and so on. Thus, the gNB-CU (208a-208n) behaves as a master node for both the gNB-DUs 212a-212n and the WLAN DUs 214a-214n.

In an embodiment, the control signaling may be routed through the gNB-CU (208a-208n). The UE 204 uses a RRC protocol to exchange the control signaling with the gNB-CU (208a-208n). In an embodiment, the gNB-CU (208a-208n) and the UE 204 may support transfer of data and RAN signaling over the WLAN DU 214a (i.e., of support for transfer of RRC and PDCP layer Protocol Data Units (PDUs) over the WLAN DU 214a). Thus, enabling the configuration of both the RATs in a uniform manner resulting in a centralized control at the RAN level.

Further, the gNB-CU (208a-208n) can be connected to an Access and Mobility Function (AMF) of the 5GC 202 using the N2 interface for control (as illustrated in FIG. 3b). The gNB-CU (208a-208n) can also be connected to a User Plane Function (UPF) within the 5GC 202 for enabling data transfer using the N3 interface (as illustrated in FIG. 3c).

Figure 5:
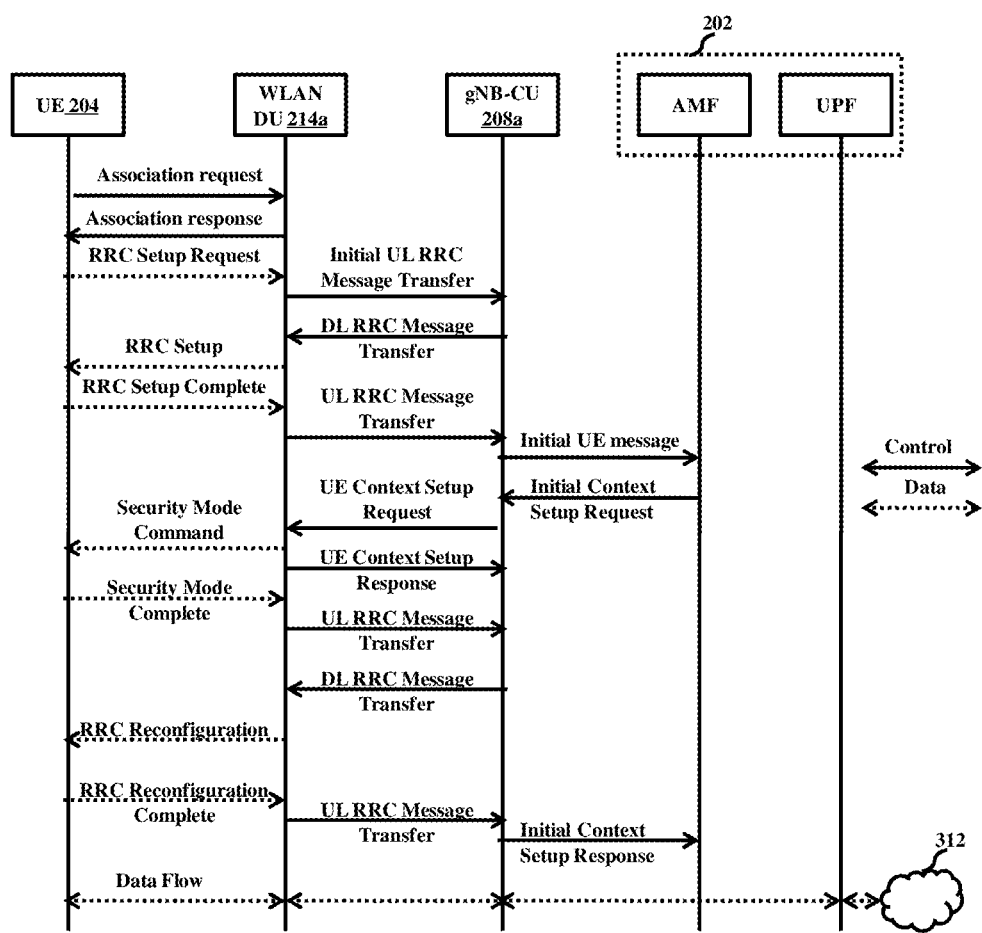
FIG. 5 is a sequence diagram illustrating a flow for performing a UE registration procedure when a Wireless Local Area Network (WLAN) distributed unit (WLAN DU) is connected as the DU to a Centralized Unit (gNodeB (gNB)-CU), according to embodiments as disclosed herein.

The at least one UE 204 can be connected to any of the gNB-DUs 212a-212n and the WLAN DU 214a-214n. The at least one UE 204 can be initially connected to the at least one gNB-DU 212a-212n according to a procedure specified in a section 8 of 3GPP TS 38.401[1]. The at least one UE 204 can be initially connected to the at least one WLAN 214a (that is connected as the gNB-DU to the gNB-CU (208a-208n)) by performing a registration procedure as illustrated in FIG. 5. The UE 204 can be connected to the gNB-DUs 212a-212n over the air interface. The UE 204 can be connected to the WLAN DU 214a over the NWu interface. In an embodiment, the UE 204 can be a 5G compliant UE, that enables the UE 204 to connect to the 5GC 202 through the at least one RAN node 206a-206n. In an embodiment, the UE 204 may be adapted with the L3 layer if the UE 204 does not have the 5G NR support for connecting to the 5GC 202 through the at least one RAN node 206a-206n (in case of the non 5G compliant UE).

Figure 4A:
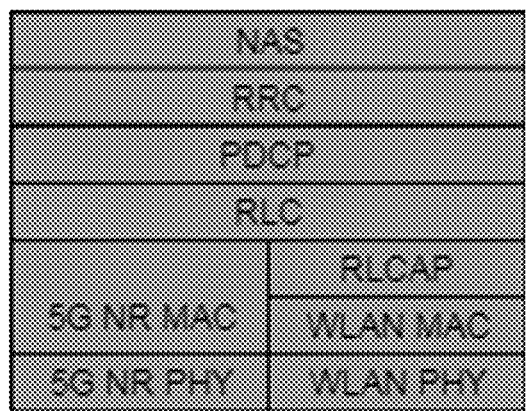
FIGS. 4a and 4b are example diagrams illustrating protocol stack of a User Equipment (UE), according to embodiments as disclosed herein.
Figure 4B:
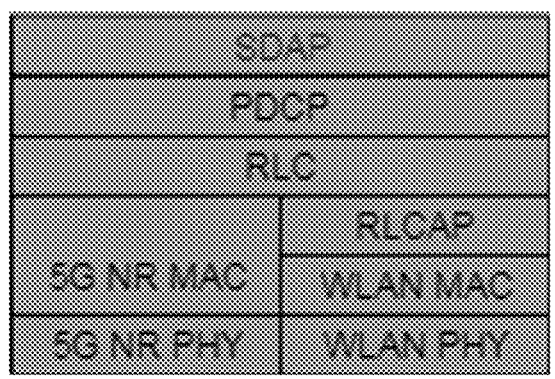

FIGS. 4a and 4b are example diagrams illustrating protocol stack of the UE 204, according to embodiments as disclosed herein. The L3 layer implemented on the UE 204 provides functionality of NAS, PDCP, RLC/RLC Adaptation Protocol (RLCAP), RRC layers on the control plane/control path of the UE 204 as illustrated in FIG. 4a. The L3 layer provides functionality of, SDAP, PDCP, RLC/RLCAP on the data plane/data path of the UE 204 as illustrated in FIG. 4b. The L3 layer can be situated as a common layer over a MAC layer and a PHY layer of the different RATs such as the 5G NR and the WLAN.

FIG. 5 is a sequence diagram illustrating a call flow/method for the UE registration procedure when the WLAN DU 214a is connected as the DU to the gNB-CU (208a-208n), according to embodiments as disclosed herein. Embodiments herein enable the UE 204 to perform the registration procedure to connect to the WLAN DU 214a initially, when the WLAN DU 214a is connected as the gNB-DU to the gNB-CU (for example: 208a).

For connecting to the WLAN DU 214a, the UE 204 can initially associate with the WLAN DU 214a (that is connected as the gNB-DU to the gNB-CU 208a) by sending an "Association Request" message to the WLAN DU 214a. The WLAN DU 214a may send an "Association Response" message to the UE 204 when the WLAN DU 214a admits the UE 204 in response to the "Association Request" message.

On receiving the "Association Response" message from the WLAN DU 214a, the UE 204 tries to register with the 5GC 202 in a similar as the UE 204 is connected to the gNB DU 212a-212n. The UE 204 sends an "RRC Setup Request" message to the WLAN DU 214a. The WLAN DU 214a carries all RRC messages as PDUs and does not interpret the received RRC messages. The WLAN DU 214a forwards the RRC messages to the adaptation layer, which encodes the RRC messages and forwards the encoded RRC message to a protocol stack of the F1 interface. The protocol stack of the F1 interface encodes the received RRC message as an F1AP message namely an "Initial Uplink (UL) RRC Message Transfer" message and sends the "Initial DL RRC Message Transfer" to the connected gNB-CU 208a.

The gNB-CU 208a allocates an identity (ID) for the UE 204 and generates an "RRC Setup" message. The allocated ID can be a gNB-CU UE F1AP ID. The gNB-CU 208a encodes the "RRC Setup" message as an F1 message like a "Downlink (DL) RRC Message Transfer" message and transfers the "DL RRC Message Transfer" message to the WLAN DU 214a. The WLAN DU 214a further sends the "RRC Setup" message encoded in the "DL RRC Message Transfer" message as data to the UE 204.

In response to the received "RRC Setup" message from the WLAN DU 214a, the UE 204 generates a "Registration Request" message and includes the "Registration Request" message in an "RRC Setup Complete" data message. The UE 204 sends the "RRC Setup Complete" data message to the WLAN DU 214a. The WLAN DU 214a encodes the data message over the F1 interface and sends the encoded data message to the gNB-CU 208a. On receiving the encoded data message from the WLAN DU 214a, the gNB-CU 208a sends an "Initial UE message" to the AMF of the 5GC 202 and passes on the "Registration Request" message to the AMF.

The AMF performs an integrity check on the received message and sends an "Initial Context Setup Request" message to the gNB-CU 208a by instructing the gNB-CU 208a to set up a context for the UE 204. The gNB-CU 208a sends a "UE Context Setup Request" message to the WLAN DU 214a to create the context for the UE 204 (by providing details of the UE, Aggregate Maximum Bit Rate (AMBR), tunnel IDs, and so on). On receiving the UE Context Setup Request" message, the WLAN DU 214a sets up the context for the UE 204 by providing details of the UE, AMBR, tunnel IDs, and so on. Once the context is set up, the WLAN DU 214a sends a "UE Context Setup Response" message to the gNB-CU 208a.

Meanwhile, the WLAN DU 214a sends a "Security Mode Command" included in the received "UE Context Setup Request" message to the UE 204. The "Security Mode Command" instructs the UE 204 for activating security on a WLAN access network. Activating the security involves integrity protection (control messages) and ciphering of RRC messages (data/control) and user data, so that all messages of the access network can be ciphered.

The UE 204 sends a "Security Mode Complete" message to the WLAN DU 214a, when all the messages of the access network are ciphered. The WLAN DU 214a relays the received "Security Mode Complete" message to the gNB-CU 208a through an "DL RRC Message Transfer" message.

On receiving the "DL RRC Message Transfer" message, the gNB-CU 208a generates an "RRC Reconfiguration" message to configure the UE 204. The gNB-CU 208a encodes the "RRC Reconfiguration" message within a "DL RRC Message Transfer" message. The gNB-CU 208a sends the "DL RRC Message Transfer" message to the WLAN DU 214a. The WLAN DU 214a decodes the "RRC Reconfiguration" message from the received "DL RRC Message Transfer" message and sends the "RRC Reconfiguration" message to the UE 204. On receiving the "RRC Reconfiguration" message, the UE 204 may perform reconfiguration procedures. The reconfiguration procedures may involve establishment/release/modification of radio bearers. Once the reconfiguration procedures are complete (that is the UE is reconfigured successfully), the UE 204 sends an "RRC Reconfiguration Complete" message to the WLAN DU 214a. The WLAN DU 214a relays the "RRC Reconfiguration Complete" message to the gNB-CU 208a over the "DL RRC Message Transfer" message. On successful completion of the RRC reconfigurations on the UE 204 as well as the UE context setup on the WLAN DU 214a, the gNB-CU 208a sends an "Initial Context Setup Response" message to the AMF of the 5GC 202. Then, the AMF may enable the UE 204 to communicate with the external data network 312, thereby the data flows can be initiated in the wireless communication network 200.

Figure 6:
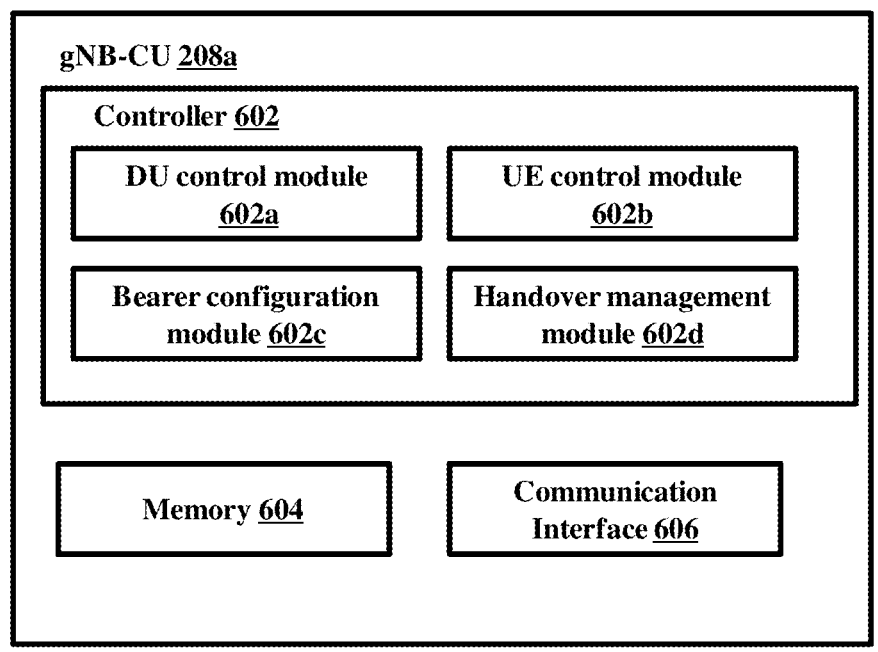
FIG. 6 is a block diagram illustrating various modules of the gNB-CU, according to embodiments as disclosed herein.

FIG. 6 is a bock diagram illustrating various modules of the gNB-CU (208a-208n), according to embodiments as disclosed herein. The gNB-CU (for example; 208a) includes a controller 602, a memory 604, and a communication interface 606.

The controller 602 can be at least one of a single processor, a plurality of processors, multiple homogeneous or heterogeneous cores, multiple Central Processing Units (CPUs) of different kinds, microcontrollers, special media, and other accelerators. The controller 602 includes a DU control module 602a, a UE control module 602b, a bearer configuration module 602c and a handover management module 602d.

The DU control module 602a can be configured to control the operations of the DUs (the gNB-DUs 212a-212n and the WLAN DUs 214a-214n). In an embodiment, the DU control module 602a can include the RAT awareness module 310. In an embodiment, the DU control module 602a can be the RAT awareness module 310 performing intended functions of the DU control module 602a. The DU control module 602a can maintain information/parameters of the gNB-DUs 212a-212n such as, but not limited to, radio information, memory information, Central Processing Unit (CPU) load information and so on, for controlling the gNB-DUs 212a-212n. The DU control module 602a also communicates with the RAT awareness module 310 of the gNB-CU 208a to control the operations of the WLAN DUs 214a-214n.

The UE control module 602b can be configured to control the UE 204 through the at least one DU 210, with which the UE 204 is connected. The UE control module 602b can be further configured to enable the UE 204 to connect with the one or more DUs 210 of the different RATs, thus providing the UE with the multi-connectivity.

Consider an example scenario, wherein a first DU 212a/214a and a second DU 212a/214a of the DUs 210 of different RATs are connected to the single gNB-CU 208a, wherein the first DU and the second DU can be at least one of the gNB-DU 212a and the WLAN DU 214a. In such a scenario, for providing the UE 204 with the multi-connectivity, the UE control module 602b receives a measurement report containing the signal strength of the neighboring DUs as perceived by the UE from the UE 204 through a first DU 212a/214a, with which the UE 204 is initially connected to. The UE control module 602b identifies a second DU 212a/214a of different RAT from the measurement report. The UE control module 602b further instructs the identified second DU 212a/214a of the different RAT to set a context for the UE 204 by reserving the resources for the UE 204. Once the context for the UE is set up on the identified second DU 212a/214a of the different RAT, the UE control module 602b configures the UE 204 in order to connect to the second DU 212a/214a of the different RAT. Thereafter, the UE control module 602b enables the UE 204 to perform at least one of a WLAN Association procedure and a Random Access (RACH) procedure to connect to the second DU 212a/214a along with the initially connected first DU 212a/214a.

Consider an example scenario, wherein the first DU 212a/214a is connected to the gNB-CU 208a and the second DU 212a/214a is connected to the gNB-CU 208b, wherein the first DU and the second DU can be at least one of the gNB-DU 212a-212n and the WLAN DU 214a-214n. In such a scenario, for providing the UE with the multi-connectivity, the UE control module 602b communicates with the gNB-CU 208b and selects the second DU of different RAT, which is controlled by the gNB-CU 208b. The UE control module 602b further communicates with the gNB-CU 208b to set up the context for the UE 204 on the selected second DU 212a/214a of the different RAT (by reserving the resources for the UE 204). Once the context for the UE 204 is set up on the selected second DU 212a/214a, the UE control module 602b configures the UE 204 in order to connect to the selected second DU 212a/214a (which is controlled by the gNB-CU 208b) along with the initially connected first DU 212a/214a.

Once the UE 204 is connected with the at least two DUs 212a/214a of different RATs, the UE control module 602b can be further configured to receive the control plane and data plane traffic of the at least one UE 204 from the at least one of the DU 212a/214a. The UE control module 602b further forwards the received control plane and data plane traffic of the at least one UE 204 to the 5GC 202. The UE control module 602b can be also configured to receive the control plane and data plane traffic from the external data network through the 5GC 202. The UE control module 602b further forwards the received control plane and data plane traffic to the at least one UE 204 through the two DUs 212a/214a.

The bearer configuration module 602c can be configured to perform a data split to create at least one data path, so that a radio bearer can take across the DUs 210 of the different RATs to exchange the data (i. e. received from the external data network 312) with the UE 204. For example, the data path can split across the gNB-DUs 212a-212n and the WLAN DUs 214a-214n to exchange the data with the UE 204. In an embodiment, the bearer configuration module 602c can include the RAT awareness module 310. In an embodiment, the bearer configuration module 602c can be the RAT awareness module 310 performing intended functions of the bearer configuration module 602c. The bearer configuration module 602c can configure the radio bearers across the DUs 210 of the different RATs based on parameters associated with the DUs 210 (the parameters can be collected using the RAT awareness module 310). Examples of the parameters can be, but not limited to, radio link, CPU load information, resources, processing capabilities, buffer status, QoS supported by the RAN type, and so on.

The handover management module 602d can be configured to manage the handover of the UE 204 from the DU of one RAT to the DU of another RAT without requiring the signaling through the 5GC 202.

The memory 604 can store at least one of details of the gNB-DUs 212a-212n, the WLAN DUs 214a-214n, the UEs 204, the 5GC 202, and so on.

The communication interface 606 can be configured to enable the gNB-CU 208a to establish communication with at least one of the gNB-DUs 212a-212n, the WLAN DUs 214a-214n, and so on.

Figure 7A:
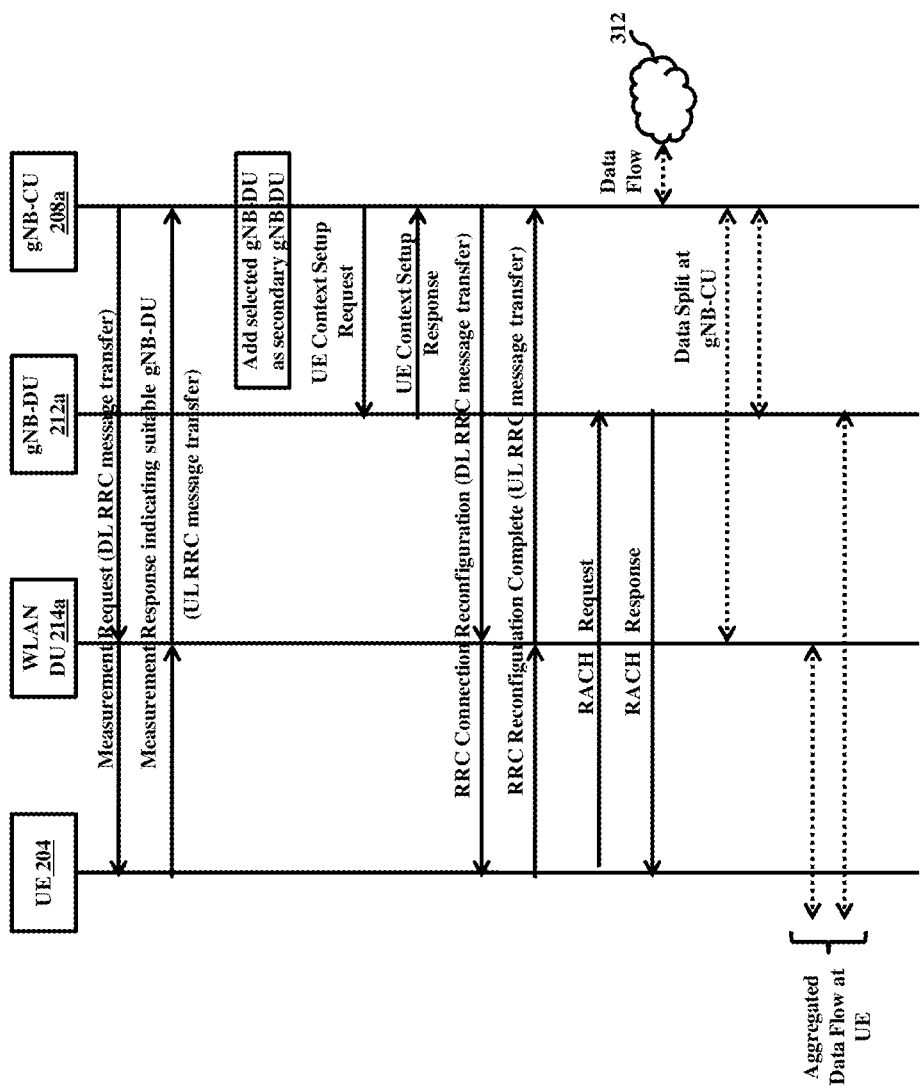
FIG. 7a is a sequence diagram illustrating a call flow for providing the UE with the multi-connectivity when the UE is initially connected to the WLAN DU and when the WLAN DU and a gNB-DU are connected to the single gNB-CU, according to embodiments as disclosed herein.
Figure 7B:
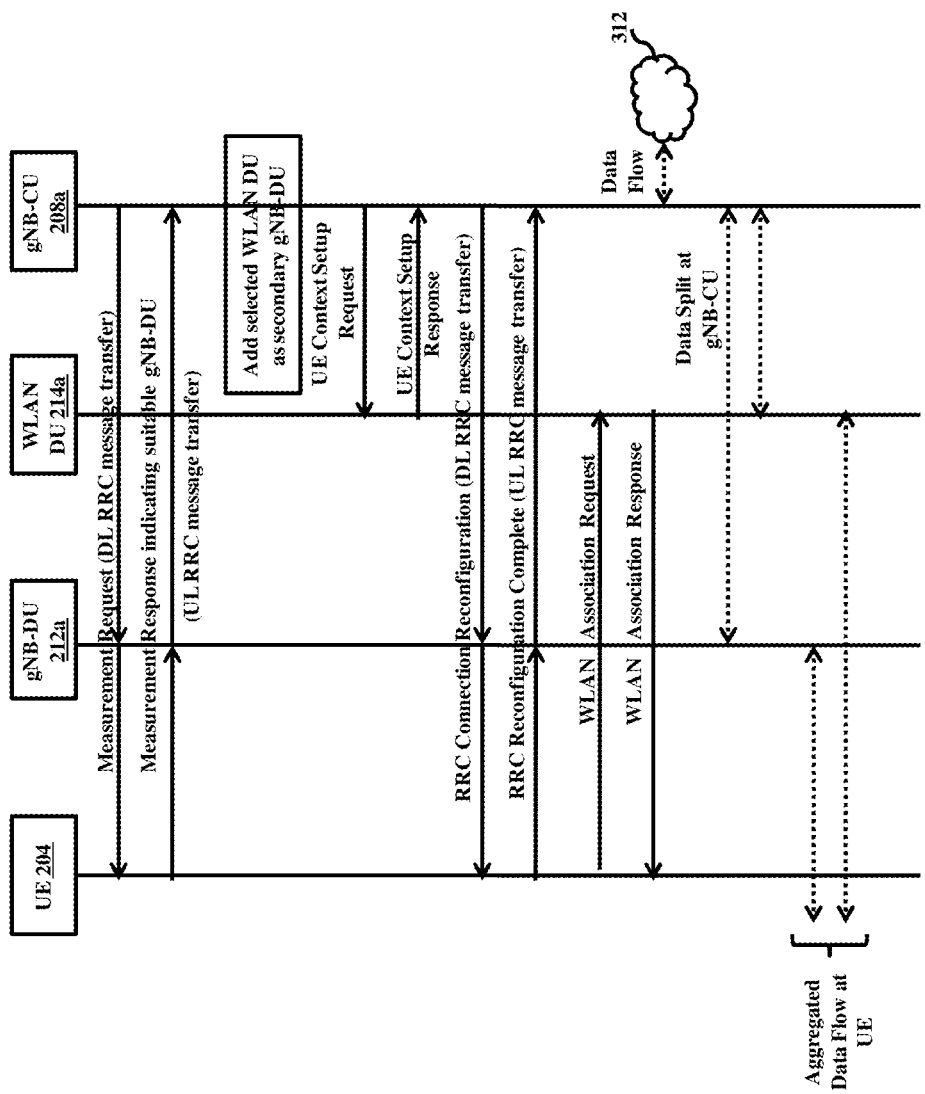
FIG. 7b is a sequence diagram illustrating a call flow for providing the UE with the multi-connectivity when the UE is initially connected to the gNB-DU and when the WLAN DU and the gNB-DU are connected to the single gNB-CU, according to embodiments as disclosed herein.

FIGS. 7a and 7b are sequence diagrams illustrating a call flow/method for providing the UE 204 with the multi-connectivity when the WLAN DU 214a and the gNB-DUs 212a-212n are connected to the single gNB-CU 208a, according to embodiments as disclosed herein.

Consider an example scenario as illustrated in FIG. 7a, wherein the UE 204 is initially connected to the WLAN DU 214a. The UE 204 can be initially connected to the WLAN DU 214a by performing the registration procedure as illustrated in FIG. 5. In such a scenario, the gNB-CU 208a connected to the WLAN DU 214a may enable the UE 204 to connect with the one of the gNB-DUs 212a-212n.

For connecting the UE 204 to the gNB-DU (for example: 212a), the gNB-CU 208a generates a "Measurement Request" message. The gNB-CU 208a further encodes the generated "Measurement Request" message as the F1AP message "DL RRC Message Transfer" message and sends the "DL RRC Message Transfer" message to the WLAN DU 214a. The WLAN DU 214a decodes the "Measurement Request" message from the "DL RRC Message Transfer" message and sends the decoded "Measurement Request" message to the UE 204.

In response to the "Measurement Request" message, the UE 204 sends a "Measurement Response" message (the RRC message) to the WLAN DU 214a. The "Measurement Response" message includes details of the suitable gNB-DU 212a (measurement report). The WLAN DU 214a further sends the "Measurement Response" message to the gNB-CU 208a through the "DL RRC Message Transfer" message over the F1 interface using a F1AP protocol.

Based on the details of the gNB-DU 212a included in the received "Measurement Response" message, the gNB-CU 208a adds the gNB-DU 212a as a secondary DU. The gNB-CU 208a further sends an "UE Context Setup Request" message to the added gNB-DU 212a for providing details of the UE, AMBR, tunnel IDs, and so on. In response to the "UE Context Setup Request" message, the gNB-DU 212a responds the gNB-CU 208a with a "UE Context Setup Response" message over the F1 interface if the resources are available for the UE 204.

The gNB-CU 208a generates a "RRC Reconfiguration" message and encodes the "RRC Reconfiguration" message as the F1AP message "DL RRC Message Transfer" message. The gNB-CU 208a sends the "DL RRC Message Transfer" message to the WLAN DU 214a over the F1 interface. The WLAN DU 214a further decodes the "RRC Reconfiguration" message from the received "DL RRC Message Transfer" message and forwards the "RRC Reconfiguration" message to the UE 204 to additionally to connect to the gNB-DU 212a. The "RRC Reconfiguration" message indicates the UE about the resources reserved by the gNB-DU 212a for the UE 204.

The UE 204 accepts configurations included in the "RRC Reconfiguration" message and responds the WLAN DU 214a with the "RRC Reconfiguration Complete" message, once the configurations are complete on the UE 204. The WLAN DU 214a encodes the received "RRC Reconfiguration Complete" message as the F1AP "DL RRC Message Transfer" message and forwards the "DL RRC Message Transfer" message to the gNB-CU 208a.

Thereafter, the UE 204 can perform the RACH procedure to connect to the gNB-DU 212a. The UE 204 sends a "RACH Request" message to the gNB-DU 212a. In response to the "RACH Request" message, the gNB-DU 212a responds the UE 204 with a "RACH Response" message that enables the UE 204 to connect to the gNB-DU 212a in addition with the initially connected WLAN DU 214a.

Once the UE 204 is connected to both the gNB-DU 212a and the WLAN DU 214a, the gNB-CU 208 can receive data of the UE 204 through at least one of the gNB-DU 212a and the WLAN DU 214a. The gNB-CU 208a can further forward the received data of the UE 204 to the external data network 312 through the 5GC 202 (during a UL data transfer). Further, the gNB-CU 208a can receive the data from the external data network 312 through the 5GC 202/ directly for the UE 204 (during a DL transfer) and can forward the received data to the UE 204. In an embodiment, the gNB-CU 208*a* can perform the data split across the gNB-DU 212*a* and the WLAN DU 214*a* (splitting a flow of data between the gNB-DU 212*a* and the WLAN DU 214*a*) in order to forward the data to the UE 204.

Consider an example scenario as illustrated in FIG. 7*b*, wherein the UE 204 is initially connected to the gNB-DU 212*a*. The UE 204 initially connects to the gNB-DU 212*a* according to the procedure specified in the Section 8 of the 3GPP TS 38.401[1]. In such a scenario, the gNB-CU 208*a*, which is connected to the gNB-DU 212*a* may enable the UE 204 to connect to the WLAN DU 214*a*, thus providing the UE 204 with the multi-connectivity.

For connecting the UE 204 to the WLAN DU 214*a*, the gNB-CU 208*a* generates the "Measurement Request" message. The gNB-CU 208*a* further encodes the generated "Measurement Request" message as the F1AP message "DL RRC Message Transfer" message and sends the encoded "DL RRC Message Transfer" message to the gNB-DU 212*a*. The gNB-DU 212*a* decodes the "Measurement Request" message from the encoded "DL RRC Message Transfer" message and sends the decoded "Measurement Request" message to the UE 204.

In response to the "Measurement Request" message, the UE 204 sends the "Measurement Response" message (the RRC message) to the gNB-DU 212*a*. The "Measurement Response" message includes details of the suitable WLAN DU 214*a*. The gNB-DU 212*a* further sends the "Measurement Response" message to the gNB-CU 208*a* through the "DL RRC Message Transfer" message over the F1 interface using the F1AP protocol.

Based on the details of the WLAN DU 214*a* included in the received "Measurement Response" message, the gNB-CU 208*a* adds the WLAN DU 214*a* as a secondary DU for the UE 204. The gNB-CU 208*a* further sends the "UE Context Setup Request" message to the added WLAN DU 214*a* for reserving the resources for the UE 204. In response to the "UE Context Setup Request" message, the WLAN DU 214*a* responds the gNB-CU 208*a* with the "UE Context Setup Response" message over the F1 interface if the resources are available for the UE 204.

The gNB-CU 208*a* then generates the "RRC Reconfiguration" message to configure the UE 204 and encodes the "RRC Reconfiguration" message as the F1AP message "DL RRC Message Transfer" message. The gNB-CU 208*a* sends the "DL RRC Message Transfer" message to the gNB-DU 212*a* over the F1 interface. The gNB-DU 212*a* further decodes the "RRC Reconfiguration" message from the received "DL RRC Message Transfer" message and forwards the "RRC Reconfiguration" message to the UE 204 to additionally to connect to the WLAN DU 214*a*. The "RRC Reconfiguration" message indicates the UE about the resources reserved by the WLAN DU 214*a* for the UE 204.

The UE 204 accepts configurations included in the "RRC Reconfiguration" message and responds the gNB-DU 212*a* with the "RRC Reconfiguration Complete" message, once the configurations are complete on the UE 204. The gNB-DU 212*a* encodes the received "RRC Reconfiguration Complete" message as the F1AP "DL RRC Message Transfer" message and forwards the "DL RRC Message Transfer" message to the gNB-CU 208*a*.

Thereafter, the UE 204 performs the WLAN Association procedure to connect to the WLAN DU 214*a*. The UE 204 sends a "WLAN Association Request" message to the WLAN DU 214*a*. In response to the WLAN Association Request" message, the WLAN DU 214*a* sends a "WLAN Association Response" message to the UE 204 indicating the successful connection establishment, so that the UE 204 can connect to the WLAN DU 214*a* along with the initially connected gNB-DU 212*a*.

Once the UE 204 is connected to both the gNB-DU 212*a* and the WLAN DU 214*a*, the gNB-CU 208*a* can receive data of the UE 204 through at least one of the gNB-DU 212*a* and the WLAN DU 214*a*. The gNB-CU 208*a* can further forward the received data of the UE 204 to the external data network 312 through the 5GC 202. Further, the gNB-CU 208*a* can receive the data from the external data network 312 through the 5GC 202 for the UE 204 and can forward the received data to the UE 204. In an embodiment, the gNB-CU 208*a* can perform the data split across the gNB-DU 212*a* and the WLAN DU 214*a* (splitting a flow of data between the gNB-DU 212*a* and the WLAN DU 214*a*) in order to forward the data to the UE 204.

Figure 8B:
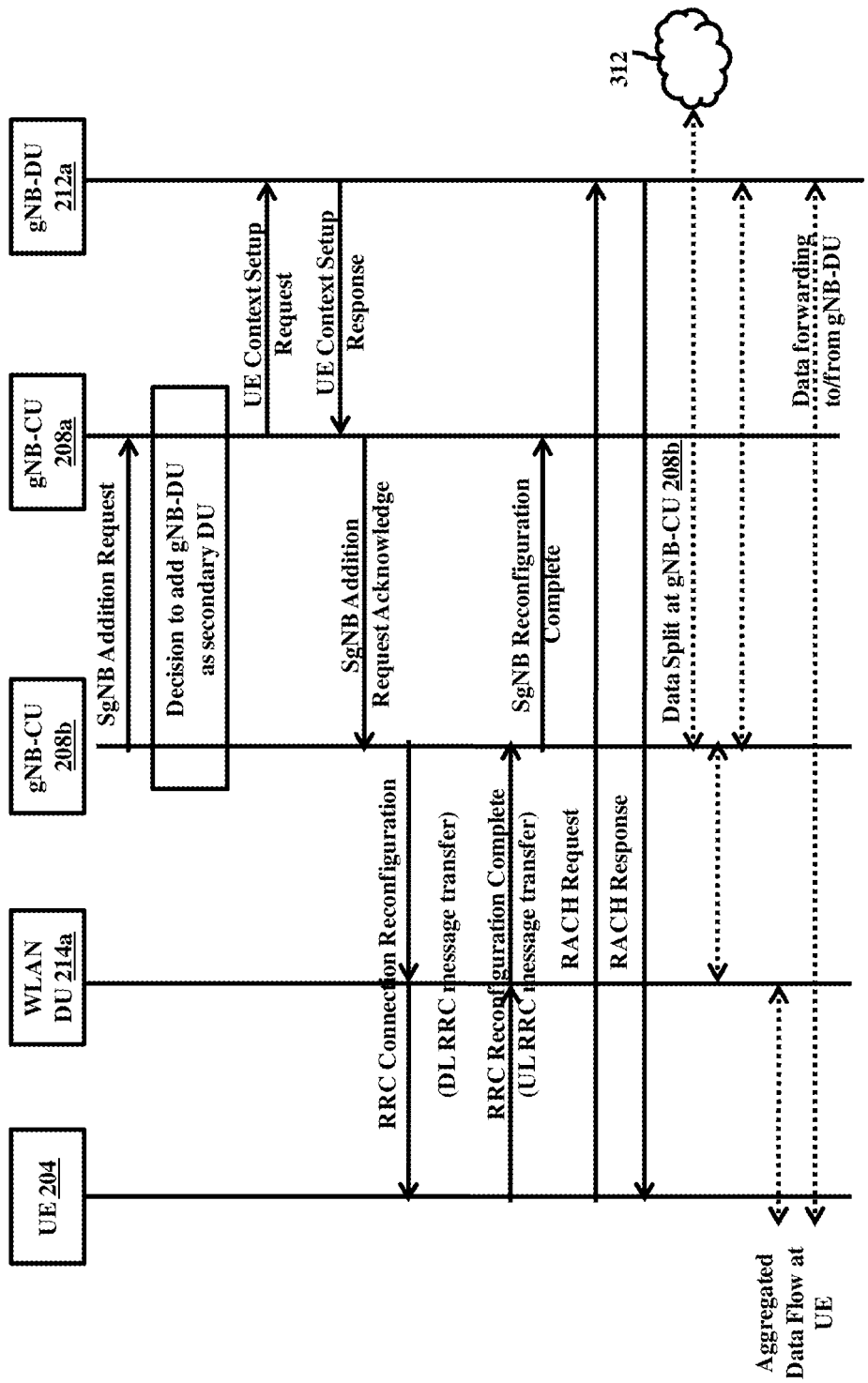
FIG. 8b is a sequence diagram illustrating a call flow for providing the UE with the multi-connectivity when the UE is initially connected to the WLAN DU and when the WLAN DU and the gNB-DU are connected to the different gNB-CUs, according to embodiments as disclosed herein.

FIGS. 8*a* and 8*b* are sequence diagrams illustrating a call flow/method for providing the UE 204 with the multi-connectivity when the WLAN DUs 214*a*-214*n* and the gNB-DUs 212*a*-212*n* are connected to the different gNB-CUs (208*a*-208*n*), according to embodiments as disclosed herein. Embodiments herein are further explained considering the integration of the WLAN DUs 214*a*-214*n* and the gNB-DUs 212*a*-212*n* with the different gNB-CUs 208. Further, embodiments herein do not restrict the usage of the multi-connectivity for only heterogeneous network scenarios and the multi-connectivity can be used when the base stations (RANs) are of the same type such as, but not limited to, macro gNBs, two femto gNBs, and so on.

Consider an example scenario as illustrated in FIG. 8*a*, wherein the UE 204 is initially connected to the gNB-DU 212*a* controlled by the gNB-CU 208*a* of the gNB-DU 206*a*. The UE 204 can connect to the gNB-DU 212*a* according to the procedure specified in the Section 8 of the #GPP TS 38.401[1]. In such a scenario, the gNB-CU 208*a*, which is connected to the gNB-DU 212*a* may enable the UE 204 to connect to the WLAN DU 214*a* that is controlled by the gNB-CU 208*b* of the gNB 206*b*, thus providing the UE 204 with the multi-connectivity.

As the UE 204 initially connects to the gNB-DU 212*a* that is controlled by the gNB-CU 208*a*, the gNB-CU 208*a* acts as a master node. The gNB-CU 208*a* sends a "Secondary node (SgNB) Addition Request" message to the gNB-CU 208*b* over the Xn interface, wherein the gNB-CU 208*b* may be connected to the WLAN DU 214*a* through the adaptation layer. The at least one of the gNB-CU 208*a* and the gNB-CU 208*b* can select the suitable WLAN DU 214*a* for the UE 204 (based on load, received signal strength, and so on) and the gNB-CU 208*b* can be informed about the selected WLAN DU 214*a*. For example, if the gNB-CU 208*a* selects the WLAN DU 214*a*, the gNB-CU 208*a* informs the gNB-CU 208*b* about the selected WLAN DU 214*a*. Further, the WLAN DU 214*a* can be added as a secondary DU for the UE 204.

Once the WLAN DU 214*a* for the UE 204 is selected, the gNB-CU 208*b* sets up the UE context on the selected WLAN DU 214*a* by sending the "UE Context Setup Request" message to the selected WLAN DU 214*a*. The WLAN DU 214*a* sends the "UE Context Setup Response" message to the gNB-CU 208*b* on successful resource allocation for the UE 204.

The gNB-CU 208*b* acknowledges the successful resource allocation on the WLAN DU 214*a* by sending a "SgNB Addition Request Acknowledge" message to the gNB-CU 208*a*.

The gNB-CU 208a then sends an "RRC Connection Reconfiguration" encoded within the "DL Message Transfer" message to the UE 204 indicating the UE 204 to connect to the WLAN DU 214a through the initially connected gNB-DU 212a.

The UE 204 responds the gNB-CU 208a by encoding an "RRC Connection Reconfiguration Complete" message in the "UL Message Transfer" message and sending the "UL Message Transfer" message to the gNB-CU 208a. In response to the received "RRC Connection Reconfiguration Complete" message, the gNB-CU 208a sends a "SgNB Reconfiguration Complete" message to the gNB-CU 208b and adds the gNB-CU 208b as a secondary node to the gNB-CU 208a.

Thereafter, the UE 204 connects to the WLAN DU 214a by sending the "WLAN Association Request" message to the WLAN DU 214a. As the resources have been reserved for the UE 204, the WLAN DU 214a responds the UE 204 with the "Association Response" message to the UE 204. Thus, the UE 204 is connected to the both the gNB-DU 212a of the 5G NR and the WLAN DU 214a.

Once the UE 204 is connected to both the gNB-DU 212a and the WLAN DU 214a, the data flow may be initiated across the network 200. Since the gNB-CU 208a acts as the master node for the UE 204, the gNB-CU 208a can receive data of the UE 204 through at least one of the gNB-DU 212a and the WLAN DU 214a. The gNB-CU 208a can further forward the received data of the UE 204 to the external data network 312 through the 5GC 202 (during UL data transfer). Further, the gNB-CU 208a can receive the data from the external data network 312 through the 5GC 202 for the UE 204 and can forward the received data to the UE 204. In an embodiment, the gNB-CU 208a can perform the data split across the gNB-DU 212a and the WLAN DU 214a (splitting the flow of data between the gNB-DU 212a and the WLAN DU 214a) in order to forward the data to the UE 204.

Consider an example scenario as illustrated in FIG. 8b, wherein the UE 204 is initially connected to the WLAN DU 214a controlled by the gNB-CU 208b of the gNB-DU 206b. The UE 204 can connect to the WLAN DU 214a by performing the registration procedure as illustrated in FIG. 5. In such a scenario, the gNB-CU 208b which is connected to the WLAN DU 214a may enable the UE 204 to connect to the gNB-DU 212a controlled by the gNB-CU 208a of the gNB 206a, thus providing the UE 204 with the multi-connectivity.

As the UE 204 initially connects to the WLAN DU 214a controlled by the gNB-CU 208b, the gNB-CU 208b acts as the master node for the UE 204. The gNB-CU 208b sends the "SgNB Addition Request" message to the gNB-CU 208a over the Xn interface. The at least one of the gNB-CU 208a and the gNB-CU 208b can select the suitable gNB-DU 212a for the UE 204 and the gNB-CU 208a can be informed about the selected gNB-DU 212a. For example, the gNB-CU 208b can select the gNB-DU 212a and informs the gNB-CU 208b about the selected gNB-DU 212a.

Once the gNB-DU 212a for the UE 204 is selected, the gNB-CU 208a sets up the UE context (by providing details of the UE, AMBR,tunnel IDs, and so on) on the selected gNB-DU 212a by sending the "UE Context Setup Request" message to the selected gNB-DU 212a. The gNB-DU 212a sends the "UE Context Setup Response" message to the gNB-CU 208a on the successful resource allocation for the UE 204.

The gNB-CU 208a acknowledges the successful resource allocation on the gNB-DU 212a by sending the "SgNB Addition Request Acknowledge" message to the gNB-CU 208b.

The gNB-CU 208b then sends the "RRC Connection Reconfiguration" encoded within the "DL Message Transfer" message to the UE 204 indicating the UE 204 to connect to the gNB-DU 212a through the initially connected WLAN DU 214a.

The UE 204 responds the gNB-CU 208b by encoding an "RRC Connection Reconfiguration Complete" message in the "UL Message Transfer" message and sending the "UL Message Transfer" message to the gNB-CU 208b. In response to the received "RRC Connection Reconfiguration Complete" message, the gNB-CU 208b sends the "SgNB Reconfiguration Complete" message to the gNB-CU 208a and adds the gNB-CU 208a as a secondary node to the gNB-CU 208b.

Thereafter, the UE 204 connects to the gNB-DU 212a by sending the "RACH Request" message to the gNB-DU 212a. As the resources have been already reserved for the UE 204, the gNB-DU 212a responds the UE 204 with the "RACH Response" message. Thus, the UE is connected to the both the gNB-DU 212a of the 5G NR and the WLAN DU 214a.

Once the UE 204 is connected to both the gNB-DU 212a and the WLAN DU 214a, the data flow may be initiated across the network 200. Since the gNB-CU 208b is the master node for the UE 204, the gNB-CU 208b can receive the data from the external data network 312 through the 5GC 202 for the UE 204 and can forward the received data to the UE 204. In an embodiment, the gNB-CU 208b can perform the data split across the gNB-DU 212a and the WLAN DU 214a (splitting the flow of data between the gNB-DU 212a and the WLAN DU 214a) in order to forward the data to the UE 204.

FIGS. 2a-8b show exemplary elements/nodes/components of the wireless communication network 200, but it is to be understood that other embodiments are not limited thereon. In other embodiments, the wireless communication network 200 may include less or a greater number of units. Further, the labels or names of the units are used only for illustrative purpose and does not limit the scope of the embodiments herein. One or more units can be combined together to perform same or substantially similar function in the wireless communication network 200.

Embodiments herein provide multi-RAT RAN aggregation within the 3GPP 5G standard with some modifications to existing protocols of nodes of the network (such as gNB-CUs and gNB-DUs of the RAN/BS, UEs, or the like) and additions of functionalities to the nodes.

Embodiments herein provide an RAN aggregation architecture for providing a UE with multi-connectivity between a non-3GPP WLAN and 5G NR RATs by aggregating multiple RATs at a RAN level. In the RAN aggregation architecture, a RAN node is divided into at least one centralized Control Unit (gNodeB (gNB)-CU) and a plurality of Distributed Units (DUs) of multiple RATs (5G gNB-DUs, WLAN DUs, or the like) facing the UEs, wherein the at least one gNB-CU controls the plurality of DUs.

Embodiments herein provide a uniform method for controlling radio resources of different RATs in the 5G network with the 5G gNB-CU acting as a controller.

Embodiments herein eliminate a need for entities such as a Non-3GPP Inter-Working Function (N3IWF) (for untrusted WLAN access) and a Trusted WLAN Gateway Function (TNGF) (for trusted access) for interfacing the WLAN with the 5GC.

Embodiments herein enable the at least one gNB-CU to control the UE and to allow the UE to connect to an additional RAT (for example, the WLAN DU) depending on capabilities of the UE and irrespective of an initial RAT (for example; 5G NR RAT), the UE is connected to.

Embodiments herein allow RRC messages to be sent encapsulated within data packets through the WLAN. Control and data messages for the UE can be easily routed through two disparate RATs within the RAN without additional signaling.

Embodiments herein allow the at least one gNB-CU to establish data bearers over the WLAN and thus enable a uniform method of bearer configuration for the non-3GPP and the 3GPP RATs using an RAT awareness module.

Embodiments herein allow the at least one gNB-CU to manage a handover of the UE between the WLAN DU and the 5G NR RAT without requiring a signaling through a Core Network.

Embodiments herein enable the UE to include an L3 layer, which enables the UE (that does not have 5G NR support) to connect to a 5G core network (5GC) through the gNB-CU, wherein the L3 layer provides the functionality of the Service Data Adaption Protocol (SDAP), Packet Data Convergence Protocol (PDCP), Radio link control (RLC) layers on a data path, and Non-Access Stratum (NAS), PDCP, Radio Resource Control (RRC), RLC layers on a control path of the UE, wherein the L3 layer is situated as a common layer, over Media Access Control (MAC) and physical (PHY) layers of different RATs (such as 5G NR and WLAN).

Embodiments herein eliminate a need for different UE registration areas across the RATs when the gNB DUs and the WLAN DUs are collocated, which reduces signaling overhead.

The embodiments disclosed herein can be implemented through at least one software program running on at least one hardware device and performing network management functions to control the elements. The elements shown in FIGS. 2a-4 and 6 can be at least one of a hardware device, or a combination of hardware device and software module.

The embodiments herein disclose methods and systems for Radio Access Network (RAN) aggregation of multiple Radio Access Technologies (RATs). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

We claim:

1. A wireless communication network comprising of at least one User Equipment (UE) and at least one Radio Access Network (RAN) node, wherein the at least one RAN node comprises:
   at least one Centralized Unit (gNodeB(gNB)-CU) connected to a core network; and
   a plurality of Distributed Units (DUs) of different Radio Access Technologies (RATs) connected to the at least one UE, wherein the plurality of DUs of the different RATs are connected to the at least one gNB-CU for providing the at least one UE with multi-connectivity between the different RATs,
   wherein the plurality of DUs includes at least one of at least one Fifth Generation (5G) New Radio (NR) DU (gNB-DU) and at least one Wireless Local Area Network (WLAN) DU,
   wherein the core network is a 5G core (5GC) network,
   wherein the at least one WLAN DU includes a WLAN Access Point (WLAN AP) and an adaptation layer, and wherein the adaptation layer is configured to:
      support a flow of signaling and data through a Radio Link Control (RLC) layer and RLC Adaptation Protocol (RLCAP) when the at least one WLAN DU is connected to the core network through the at least one gNB-CU, wherein the at least one gNB-CU is configured to control at least one operation of the at least one gNB-DU and the at least one WLAN DU in a unified manner; and
      support a control and provisioning of wireless access points (CAPWAP) protocol that enables the at least one WLAN DU to directly connect to an external data network.

2. The wireless communication network of claim 1, wherein the at least one WLAN DU is connected to the at least one gNB-CU as the at least one gNB-DU.

3. The wireless communication network of claim 1, wherein the at least one WLAN DU is connected to the at least one gNB-CU as a DU without multi-connectivity.

4. The wireless communication network of claim 1, wherein the at least one gNB-DU and the at least one WLAN DU are connected to the at least one same gNB-CU.

5. The wireless communication network of claim 1, wherein the at least one gNB-DU and the at least one WLAN DU are connected to the at least one different gNB-CU.

6. The wireless communication network of claim 1, wherein the at least one gNB-DU and the at least one WLAN DU are connected to the at least one gNB-CU over an F1 interface.

7. The wireless communication network of claim 1, wherein the at least one gNB-DU and the at least one WLAN DU are configured to:
   receive control plane traffic and data plane traffic from the at least one UE; and
   forward the received control plane traffic and the data plane traffic of the at least one UE to the at least one gNB-CU over the F1 interface.

8. The wireless communication network of claim 1, wherein the at least one gNB-CU is configured to:
   control the at least one UE through the connected at least one gNB-DU and at least one WLAN DU;
   provide the at least one UE with the multi-connectivity by enabling the at least one UE to connect with the at least one gNB-DU and the at least one WLAN DU at a time;
   receive control plane traffic and data plane traffic of the at least one UE through at least one of the connected at least one gNB-DU and at least one WLAN DU;
   forward the received control plane traffic and the data plane traffic to the core network;
   perform a bearer configuration to split a data path across the at least one gNB-DU and the at least one WLAN DU to forward the data plane traffic received from an external data network through the core network to the at least one UE;
   receive and forward the data plane traffic directly from and to the external data network; and
   manage a handover of the at least one UE between the different RATs without requiring a signaling through the core network.

9. The wireless communication network of claim 8, wherein the at least one gNB-CU includes an RAT awareness module to control the at least one operation of the at least one WLAN DU.

10. The wireless communication network of claim 8, wherein the at least one gNB-CU is further configured to provide the at least one UE with the multi-connectivity when the at least one gNB-DU and the at least one WLAN DU are connected to the at least one same gNB-CU, and the at least one UE is initially connected to the at least one WLAN by:
   receiving a measurement report from the at least one UE through the at least one WLAN DU with which the at least one UE is initially connected to;
   identifying the at least one gNB-DU using the received measurement report;
   instructing the identified at least one gNB-DU for setting up a context for the at least one UE by providing details of the at least one UE;
   configuring the at least one UE after setting up the context for the at least one UE on the identified at least one gNB-DU; and
   enabling the at least one UE to perform a Random Access (RCH) procedure to connect additionally to the identified at least one gNB-DU along with the initially connected at least one WLAN DU.

11. The wireless communication network of claim 8, wherein the at least one gNB-CU is further configured to provide the at least one UE with the multi-connectivity when the at least one gNB-DU and the at least one WLAN DU are connected to the at least one same gNB-CU and the at least one UE is initially connected to the at least one gNB-DU by:
   receiving a measurement report from the at least one UE through the at least one gNB-DU with which the at least one UE is initially connected to;
   identifying the at least one WLAN DU using the received measurement report;
   instructing the identified at least one WLAN DU for setting up a context for the at least one UE by providing the details of the at least one UE;
   configuring the at least one UE after setting up the context for the at least one UE on the identified at least one WLAN DU; and
   enabling the at least one UE to perform a WLAN Association procedure to connect additionally to the identified at least one WLAN DU along with the initially connected at least one gNB-DU.

12. The wireless communication network of claim 8, wherein a first gNB-CU of the at least one gNB-CU is further configured to provide the at least one UE with the multi-connectivity when the at least one gNB-DU is connected to the first gNB-CU, the at least one WLAN DU is connected to a second gNB-CU of the at least one gNB-CU, and the at least one UE is initially connected to the at least one gNB-DU by:
   communicating with the second gNB-CU over an Xn interface to select the at least one WLAN DU that is controlled by the second gNB-CU;
   instructing the second gNB-CU for setting up a context for the at least one UE on the selected at least one WLAN DU by providing the details of the at least one UE;
   configuring the at least one UE after setting up the context for the at least one UE on the selected at least one WLAN DU; and
   enabling the at least one UE to perform a WLAN Association procedure to connect additionally to the identified at least one WLAN DU along with the initially connected at least one gNB-DU.

13. The wireless communication network of claim 8, wherein the second gNB-CU is further configured to provide the at least one UE with the multi-connectivity when the at least one gNB-DU is connected to the first gNB-CU, the at least one WLAN DU is connected to the second gNB-CU, and the at least one UE is initially connected to the at least one WLAN DU by:
   communicating with the first gNB-CU over an Xn interface to select the at least one gNB-DU that is controlled by the first gNB-CU;
   instructing the first gNB-CU for setting up a context for the at least one UE on the selected at least one gNB-DU by reserving the resources for the at least one UE;
   configuring the at least one UE after setting up the context for the at least one UE on the selected at least one gNB-DU; and
   enabling the at least one UE to perform the RACH procedure to connect additionally to the identified at least one gNB-DU along with the initially connected at least one WLAN DU.

14. The wireless communication network of claim 1, wherein the at least one UE is configured to initially connect to the at least one WLAN DU that is controlled by the at least one gNB-CU by:
   associating with the at least one WLAN DU by exchanging association messages with the at least one WLAN DU;
   sending a Radio Resource Control (RRC) setup request to the at least one gNB-CU through the associated at least one WLAN DU to connect to the core network;

receiving an RRC setup message from the at least one gNB-CU through the at least one WLAN DU, wherein the RRC setup message includes an identity allocated by the gNB-CU in response to the received RRC setup message;

generating a registration request in response to the received RRC setup message and including the registration request in an RRC setup complete message;

sending the RRC setup complete message to the at least one gNB-CU through the at least one WLAN DU, wherein the at least one gNB-CU sends an initial UE message including the registration request to the core network and receives an initial context setup request message from the core network to setup a context for the at least one UE;

receiving a security mode command from the at least one WLAN DU for activating security on an access network after setting up a context for the at least one UE by the at least one gNB-CU;

sending a security mode complete message to the at least one gNB-CU through the at least one WLAN DU after activating the security on the access network;

receiving an RRC reconfiguration message from the at least one gNB-CU through the at least one WLAN DU in response to the security mode complete message; and performing a reconfiguration procedure and sending a reconfiguration complete message to the at least one gNB-CU through the at least one WLAN DU, wherein in response to the received reconfiguration complete message, the at least one gNB-CU sends an initial context setup message to the core network that enables the at least one UE to initially connect to the at least one WLAN DU.

15. The wireless communication network of claim 1, wherein the at least one UE includes a L3 layer to connect to the core network through the at least one RAN node when the at least one UE is a 5G non-compliant UE.

16. A method for providing at least one UE with multi-connectivity in a wireless communication network, the method comprises connecting a plurality of Distributed Units (DUs) of different Radio Access Technologies (RATs) to at least one Centralized Unit (gNodeB(gNB)-CU) within at least one Radio Access Network (RAN) node for providing the at least one UE with the multi-connectivity, wherein the plurality of DUs are connected to the at least one UE and the at least one gNB-CU is connected to a core network, wherein the plurality of DUs includes at least one of at least one Fifth Generation (5G) New Radio (NR) DU (gNB-DU) and at least one Wireless Local Area Network (WLAN) DU (WLAN DU), wherein the core network is a 5G core (5GC) network, and wherein the at least one WLAN DU includes a WLAN Access Point (WLAN AP) and an adaptation layer;

supporting, of the at least one WLAN DU, by the adaptation layer, a flow of signaling and data through a Radio Link Control (RLC) layer and the RLC Adaptation Protocol (RLCAP) when the at least one WLAN DU is connected to the core network through the at least one gNB-CU;

supporting, by the adaptation layer, a control and provisioning of wireless access points (CAPWAP) protocol that enables the at least one WLAN DU to directly connect to an external data network; and controlling, by the at least one gNB-CU, at least one operation of the at least one gNB-DU and the at least one WLAN DU in a unified manner).

17. The method of claim 16, wherein the at least one gNB-DU and the at least one WLAN DU are connected to the at least one same gNB-CU.

18. The method of claim 16, wherein the at least one gNB-DU and the at least one WLAN DU are connected to the at least one different gNB-CU.

19. The method of claim 16, wherein the at least one gNB-DU and the at least one WLAN DU are connected to the at least one gNB-CU over an F1 interface.

20. The method of claim 16, the method comprises:

receiving, by the at least one gNB-DU and the at least one WLAN DU, control plane traffic and data plane traffic from the at least one UE; and forwarding, by the at least one gNB-DU and the at least one WLAN DU, the received control plane traffic and the data plane traffic of the at least one UE to the at least one gNB-CU over the F1 interface.

21. The method of claim 16, the method comprises:

controlling, by the at least one gNB-CU, at least one operation of the at least one UE through at least one of the connected at least one gNB-DU and at least one WLAN DU;

providing, by the at least one gNB-CU, the at least one UE with the multi-connectivity by enabling the at least one UE to connect with the at least one gNB-DU and the at least one WLAN DU at a time;

receiving, by the at least one gNB-CU, control plane traffic and data plane traffic of the at least one UE through at least one of the connected at least one gNB-DU and at least one WLAN DU;

forwarding, by at least one gNB-CU, the received control plane traffic and the data plane traffic to the core network;

performing, by the at least one gNB-CU, a bearer configuration to split a data path across the at least one gNB-DU and the at least one WLAN DU to forward the data plane traffic received from the external data network through the core network to the at least one UE; and managing, by the at least one gNB-CU, a handover of the at least one UE between the different RATs without requiring a signaling through the core network.

22. The method of claim 21, wherein the at least one gNB-CU includes an RAT awareness module to control the at least one operation of the at least one WLAN DU.

23. The method of claim 21, wherein providing, by the at least one gNB-CU, the at least one UE with the multi-connectivity when the at least one gNB-DU and the at least one WLAN DU are connected to the at least one same gNB-CU, and the at least one UE is initially connected to the at least one WLAN includes:

receiving measurement report from the at least one UE through the at least one WLAN DU with which the at least one UE is initially connected to;

identifying the at least one gNB-DU using the received at least one measurement report;

instructing the identified at least one gNB-DU for setting up a context for the at least one UE by providing details of the at least one UE;

configuring the at least one UE after setting up the context for the at least one UE on the identified at least one gNB-DU; and enabling the at least one UE to perform a Random Access (RCH) procedure to connect additionally to the identified at least one gNB-DU along with the initially connected at least one WLAN DU.

24. The method of claim 21, wherein providing, by the at least one gNB-CU, the at least one UE with the multi-connectivity when the at least one gNB-DU and the at least one WLAN DU are connected to the at least one same gNB-CU and the at least one UE is initially connected to the at least one gNB-DU by:
receiving a measurement report from the at least one UE through the at least one gNB-DU with which the at least one UE is initially connected to;
identifying the at least one WLAN DU using the received measurement report;
instructing the identified at least one WLAN DU for setting up the context for the at least one UE by providing the details of the at least one UE;
configuring the at least one UE after setting up a context for the at least one UE on the identified at least one WLAN DU; and
enabling the at least one UE to perform a WLAN Association procedure to connect additionally to the identified at least one WLAN DU along with the initially connected at least one gNB-DU.

25. The method of claim 21, wherein providing, by a first gNB-CU of the at least one gNB-CU, the at least one UE with the multi-connectivity when the at least one gNB-DU is connected to the first gNB-CU, the at least one WLAN DU is connected to a second gNB-CU of the at least one gNB-CU, and the at least one UE is initially connected to the at least one gNB-DU includes:
communicating with the second gNB-CU over an Xn interface to select the at least one WLAN DU that is controlled by the second gNB-CU;
instructing the second gNB-CU for setting up a context for the at least one UE on the selected at least one WLAN DU by providing the details of the at least one UE;
configuring the at least one UE after setting up the context for the at least one UE on the selected at least one WLAN DU; and
enabling the at least one UE to perform a WLAN Association procedure to connect additionally to identified at least one WLAN DU along with the initially connected at least one gNB-DU.

26. The method of claim 21, wherein providing, by the second gNB-CU, the at least one UE with the multi-connectivity when the at least one gNB-DU is connected to the first gNB-CU, the at least one WLAN DU is connected to the second gNB-CU, and the at least one UE is initially connected to the at least one WLAN DU includes:
communicating with the first gNB-CU over an Xn interface to select the at least one gNB-DU that is controlled by the first gNB-CU;
instructing the first gNB-CU for setting up a context for the at least one UE on the selected at least one gNB-DU by providing the details of the at least one UE;
configuring the at least one UE after setting up the context for the at least one UE on the selected at least one gNB DU; and
enabling the at least one UE to perform a RACH procedure to connect additionally to identified at least one gNB-DU along with the initially connected at least one WLAN DU.

27. The method of claim 16, the method comprises connecting, by the at least one UE, with the at least one WLAN DU initially that is controlled by the at least one gNB-CU includes:
associating with the at least one WLAN DU by exchanging association messages with the at least one WLAN DU;
sending a Radio Resource Control (RRC) setup request to the at least one gNB-CU through the associated at least one WLAN DU to connect to the core network;
receiving an RRC setup message from the at least one gNB-CU through the at least one WLAN DU, wherein the RRC setup message includes an identity allocated by the gNB-CU in response to the received RRC setup message;
generating a registration request in response to the received RRC setup message and including the registration request in an RRC setup complete message;
sending the RRC setup complete message to the at least one gNB-CU through the at least one WLAN DU, wherein the at least one gNB-CU sends an initial UE message including the registration request to the core network and receives an initial context setup request message from the core network to setup a context for the at least one UE;
receiving a security mode command from the at least one WLAN DU for activating security on an access network after setting up a context for the at least one UE by the at least one gNB-CU;
sending a security mode complete message to the at least one gNB-CU through the at least one WLAN DU after activating the security on the access network;
receiving an RRC reconfiguration message from the at least one gNB-CU through the at least one WLAN DU in response to the security mode complete message; and
performing a reconfiguration procedure and sending a reconfiguration complete message to the at least one gNB-CU through the at least one WLAN DU, wherein in response to the received reconfiguration complete message, the at least one gNB-CU sends an initial context setup message to the core network that enables the at least one UE to initially connect to the at least one WLAN DU.

28. The method of claim 16, wherein the at least one UE includes a L3 layer to connect to the core network through the at least one RAN node when the at least one UE is a 5G non-compliant UE.

29. A centralized unit (gNodeB(gNB)-CU) of a Radio Access Network (RAN) node in a wireless communication network, the gNB-CU comprising:
a memory; and
a controller coupled to the memory (604) configured to:
control at least one operation of a plurality of Distributed Units (DUs) of different Radio Access Technologies (RATs) connected to the gNB-CU;
provide the at least one UE with multi-connectivity between the different RATs; and
provide the at least one UE with the multi-connectivity when the plurality of DUs are connected to the gNB-CU by receiving a measurement report from the at least one UE through at least one first DU of the plurality of DUs with which the at least one UE is initially connected to:
identifying at least one second DU of the plurality of DUs using the received measurement report;
instructing the identified at least one at least one second DU for setting up a context for the at least one UE by providing details of the at least one UE;

configuring the at least one UE after setting up the context for the at least one UE on the identified at least one at least one second DU; and enabling the at least one UE to perform at least one of a WLAN Association procedure and a Random Access (RACH) procedure to connect additionally to the identified at least one second DU along with the initially connected at least one first DU, wherein the at least one first DU and the at least one second DU are at least one of the at least one gNB DU and the at least one WLAN DU.

30. The gNB-CU of claim 29, wherein the plurality of DUs includes at least one of at least one Fifth Generation (5G) New Radio (NR) DU (gNB-DU) and at least one Wireless Local Area Network (WLAN) DU (WLAN DU), wherein the core network is a 5G core (5GC) network.

31. The gNB-CU of claim 29, wherein the controller of the gNB-CU is further configured to communicate with at least one another gNB-CU to provide the at least one UE with the multi-connectivity when the at least one first DU is connected to the gNB-CU and the at least one second DU is connected to another gNB-CU.

32. A User Equipment in a wireless communication network comprising of at least one Centralized Unit (gNodeB(gNB)-CU) connected to a plurality of Distributed Units (DUs) of different Radio Access Technologies (RATs), wherein the UE includes at least one processor configured to:

connect to at least two DUs of the different RATs for accessing multi-connectivity, wherein the plurality of DUs include at least one of at least one Fifth Generation (5G) New Radio (NR) DU (gNB-DU) and at least one Wireless Local Area Network (WLAN) DU (WLAN DU), and wherein the UE connects to the at least one WLAN DU by:

associating with the at least one WLAN DU by exchanging association messages with the at least one WLAN DU;

sending a Radio Resource Control (RRC) setup request to the at least one gNB-CU through the associated at least one WLAN DU to connect to the core network; and receiving an RRC setup message from the at least one gNB-CU through the at least one WLAN DU, wherein the RRC setup message includes an identity allocated by the gNB-CU in response to the received RRC setup message; and connect to at least one 5G core network (5GC) using an L3 layer.

33. The UE of claim 32, wherein the L3 layer provides functionality of Service Data Adaption Protocol (SDAP), Packet Data Convergence Protocol (PDCP), Radio link control (RLC), RLC Adaptation Protocol (RLCAP) on a data path, and Non-Access Stratum (NAS), PDCP, Radio Resource Control (RRC), RLCAP on a control path of the UE.

34. The UE of claim 32, wherein the UE connects to the at least one WLAN DU by:

generating a registration request in response to the received RRC setup message and including the registration request in an RRC setup complete message;

sending the RRC setup complete message to the at least one gNB-CU through the at least one WLAN DU, wherein the at least one gNB-CU sends an initial UE message including the registration request to the core network and receives an initial context setup request message from the core network to setup a context for the at least one UE;

receiving a security mode command from the at least one WLAN DU for activating security on an access network after setting up a context for the at least one UE by the at least one gNB-CU;

sending a security mode complete message to the at least one gNB-CU through the at least one WLAN DU after activating the security on the access network;

receiving an RRC reconfiguration message from the at least one gNB-CU through the at least one WLAN DU in response to the security mode complete message; and performing a reconfiguration procedure and sending a reconfiguration complete message to the at least one gNB-CU through the at least one WLAN DU, wherein in response to the received reconfiguration complete message, the at least one gNB-CU sends an initial context setup message to the core network that enables the at least one UE to initially connect to the at least one WLAN DU.

* * * * *